(12) United States Patent
Takashima et al.

(10) Patent No.: US 6,987,526 B2
(45) Date of Patent: Jan. 17, 2006

(54) DATA TRANSMISSION METHOD AND DATA TRANSMISSION SYSTEM

(75) Inventors: Masatoshi Takashima, Tokyo (JP); Hideyuki Narita, Kanagawa (JP); Haruyoshi Murayama, Kanagawa (JP); Yoshiyuki Ito, Tokyo (JP); Daisuke Hiranaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 09/811,099

(22) Filed: Mar. 16, 2001

(65) Prior Publication Data

US 2002/0015108 A1 Feb. 7, 2002

(30) Foreign Application Priority Data

Mar. 17, 2000 (JP) ............................. P2000-081851

(51) Int. Cl.
*H04N 7/14* (2006.01)

(52) U.S. Cl. ............................. 348/14.01; 348/14.02; 370/260; 370/517

(58) Field of Classification Search .. 348/14.01–14.09, 348/14.1, 14.11–14.14; 370/260, 261, 254, 370/517; 209/204
See application file for complete search history.

(56) References Cited

U.S. PATENT DOCUMENTS

| | | | | | |
|---|---|---|---|---|---|
| 5,689,553 | A | * | 11/1997 | Ahuja et al. | 379/202.01 |
| 5,835,129 | A | * | 11/1998 | Kumar | 348/14.09 |
| 5,844,600 | A | * | 12/1998 | Kerr | 348/14.12 |
| 2001/0054071 | A1 | * | 12/2001 | Loeb | 709/205 |

* cited by examiner

*Primary Examiner*—Melur Ramakrishnaiah
(74) *Attorney, Agent, or Firm*—Sonnenschein, Nath & Rosenthal LLP

(57) ABSTRACT

A data transmission method and a data transmission system not requiring a large delay unit for multiplexing and composition and capable of reducing the hardware scale, wherein when transmitting data among multiple points from a plurality of terminals arranged in a network, when the data at multiple points are transmitted to the terminals, in the network, identical packets are added different time stamps in accordance with the transmission delays, whereby the data shifted in accordance with the transmission delays are transmitted.

6 Claims, 20 Drawing Sheets

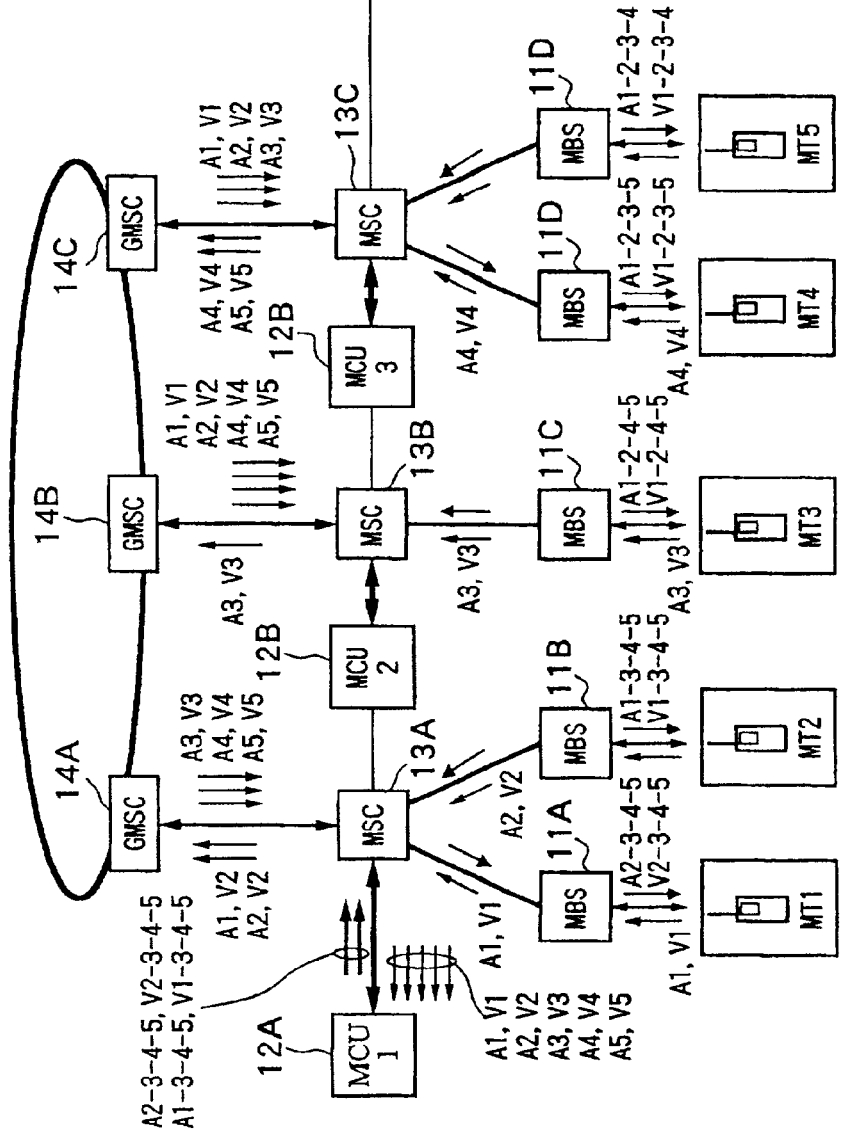

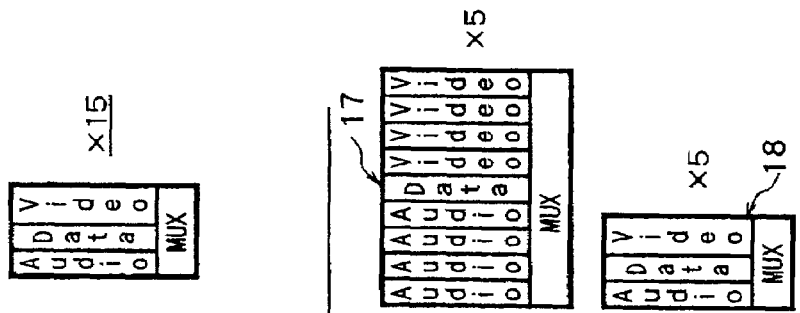
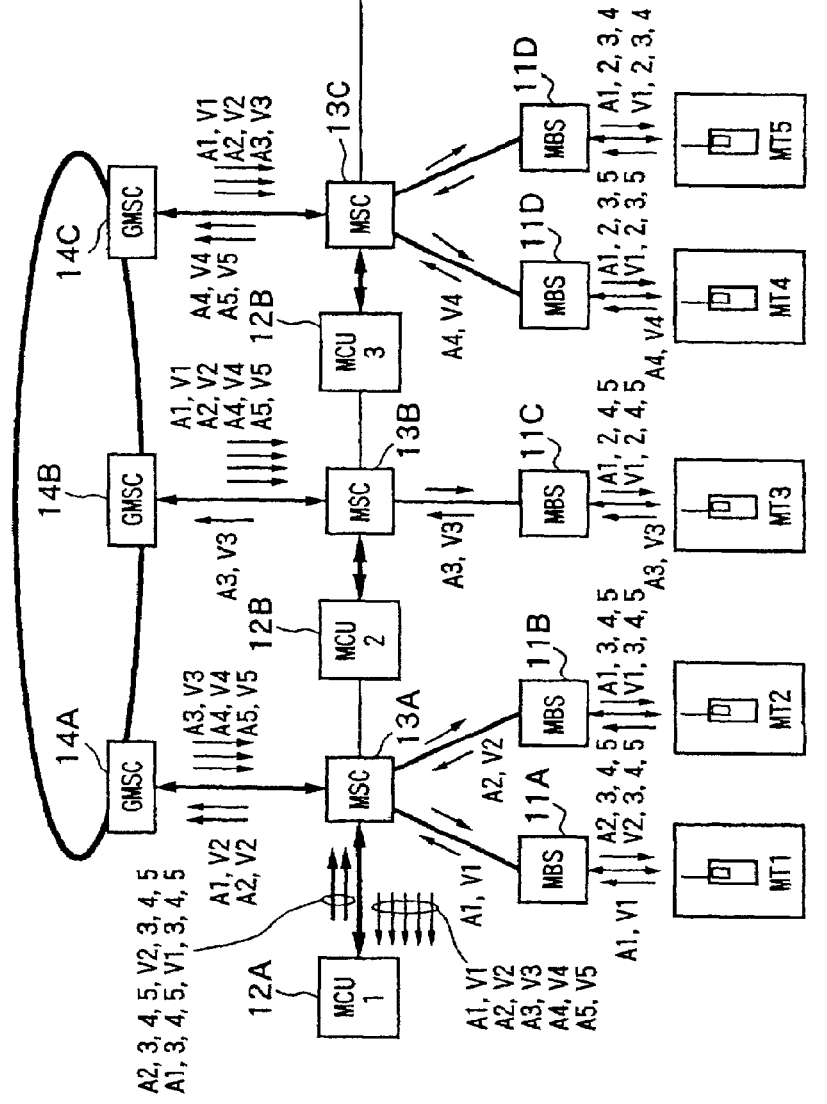

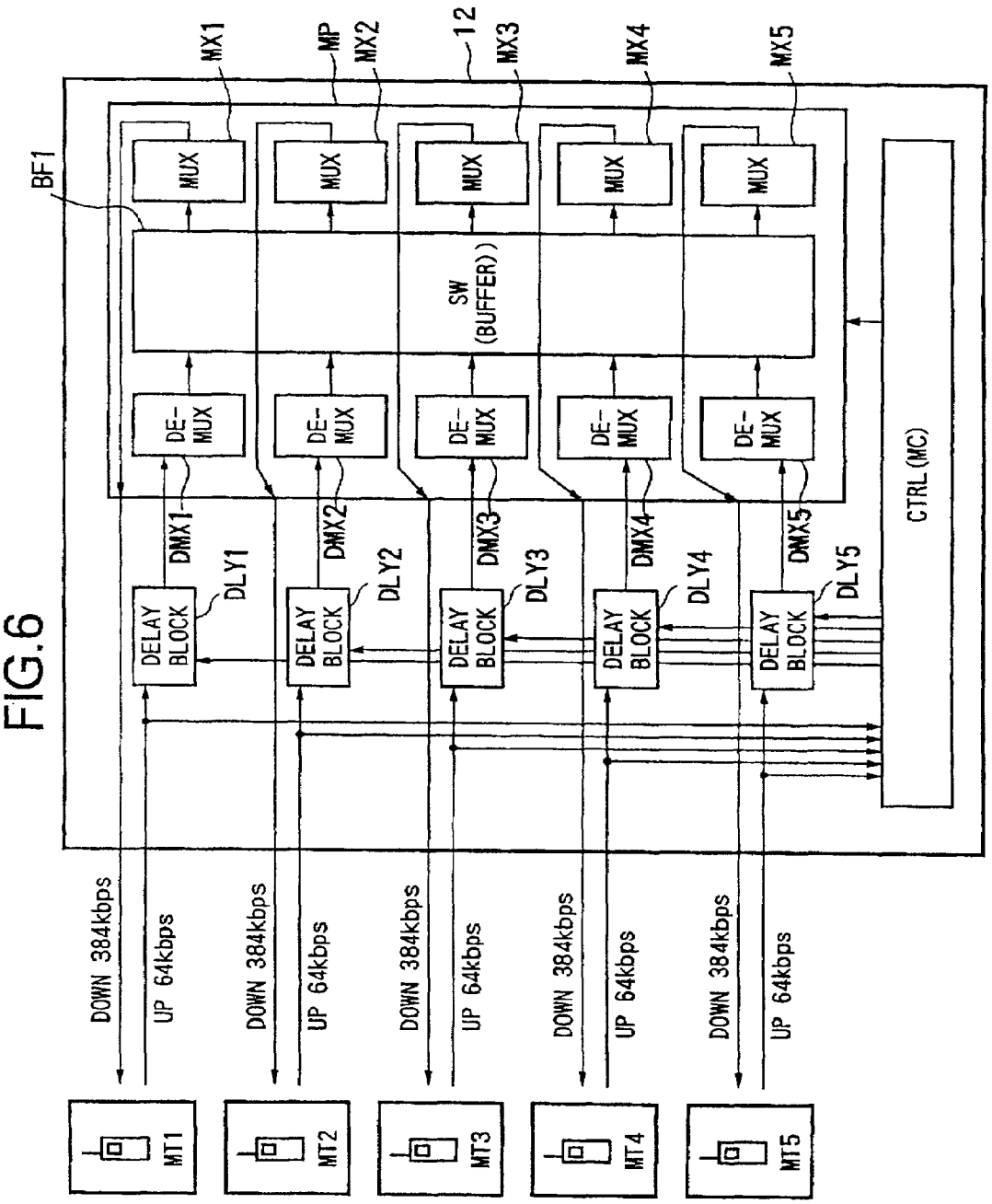

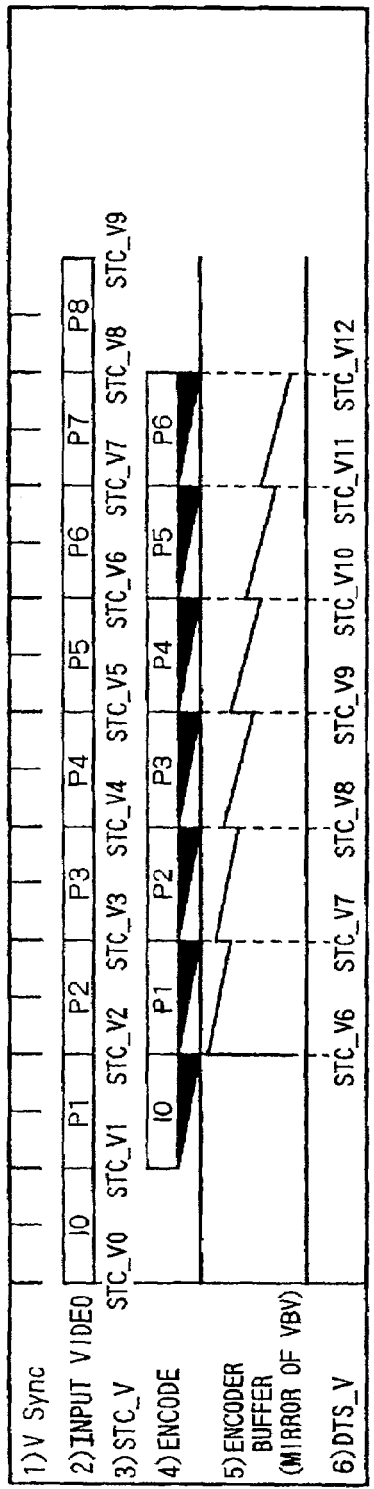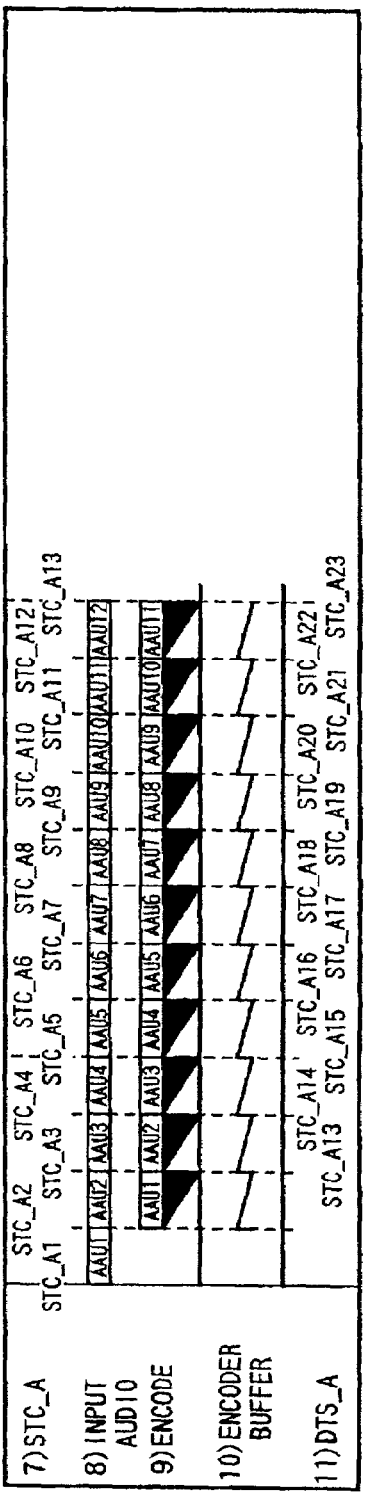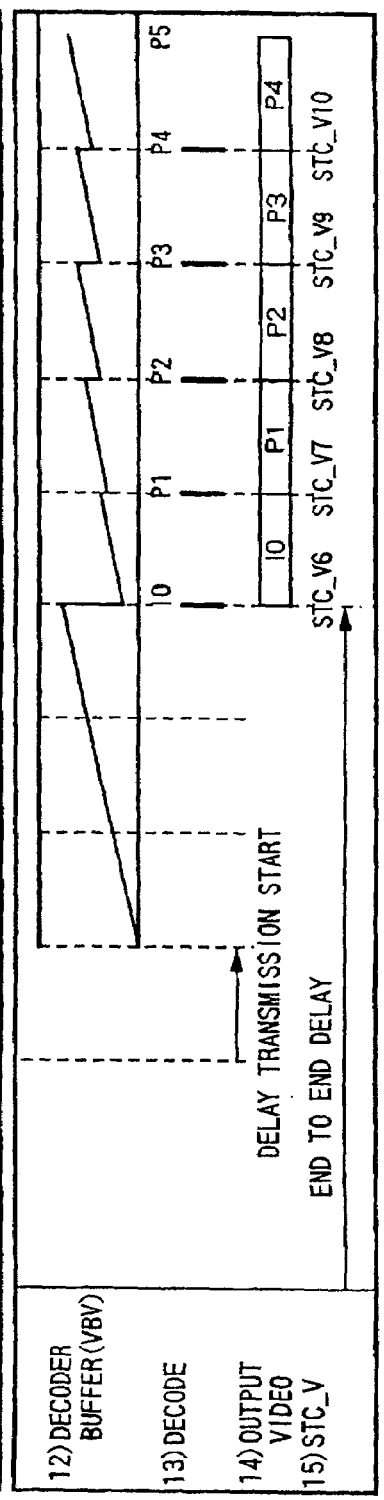
FIG.7A VIDEO ENCODING
FIG.7B AUDIO ENCODING
FIG.7C VIDEO ENCODING

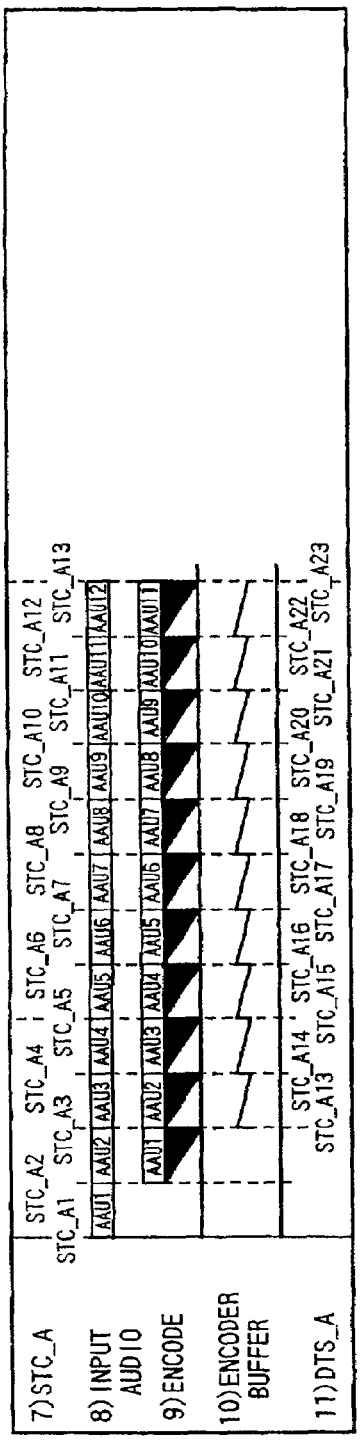
FIG.8A AUDIO ENCODING
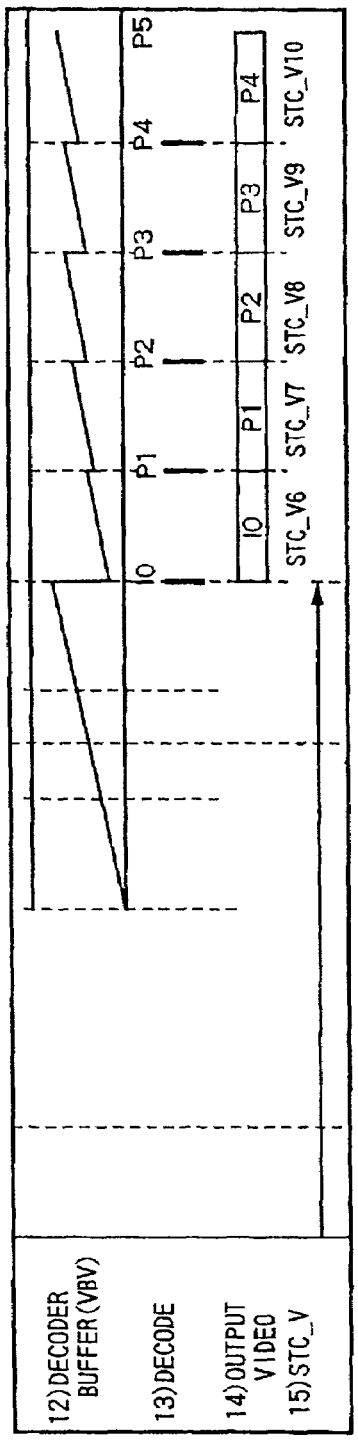
FIG.8B VIDEO ENCODING
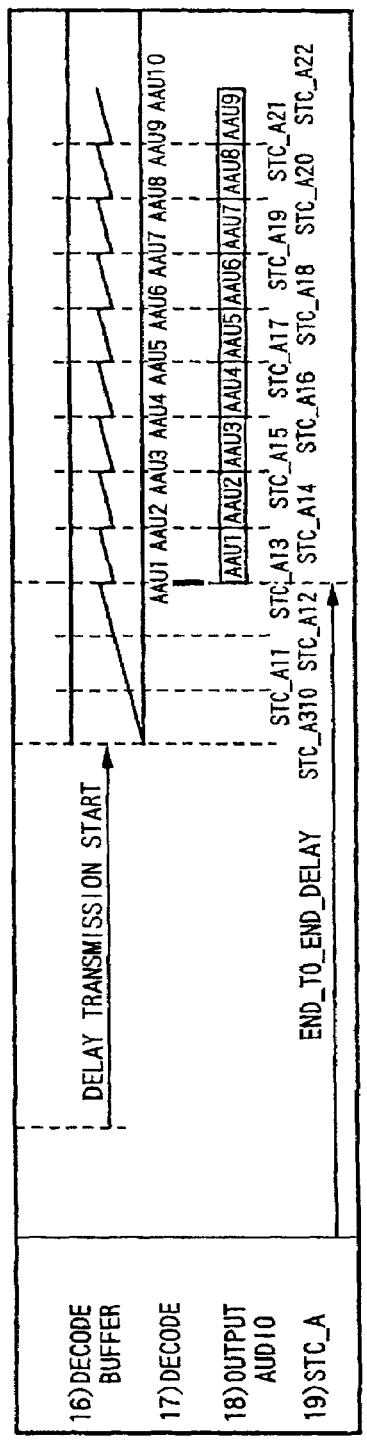
FIG.8C AUDIO ENCODING

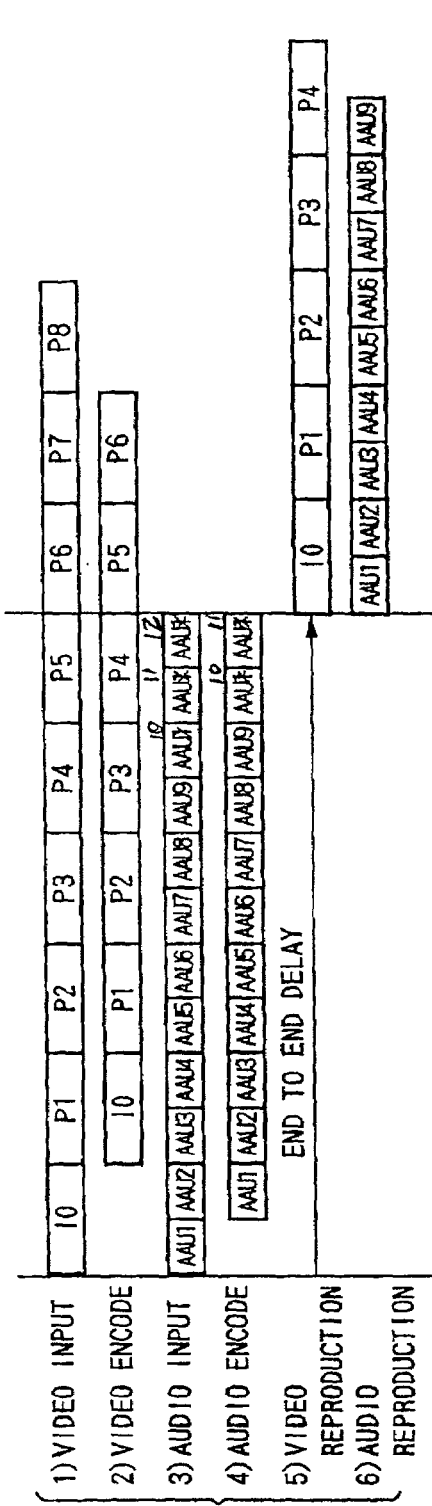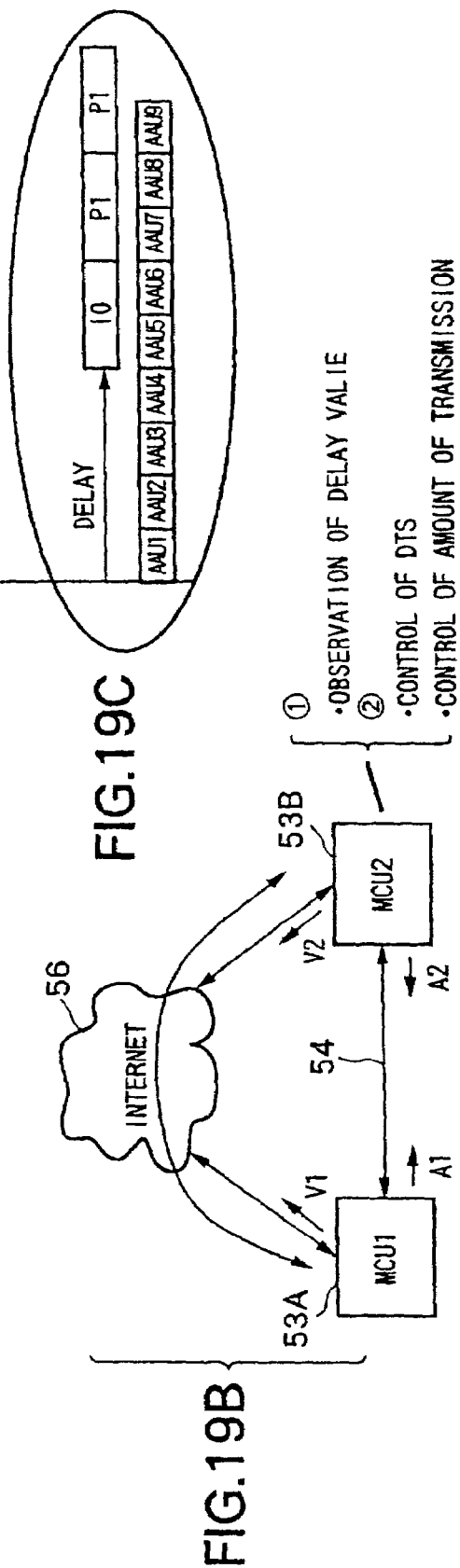

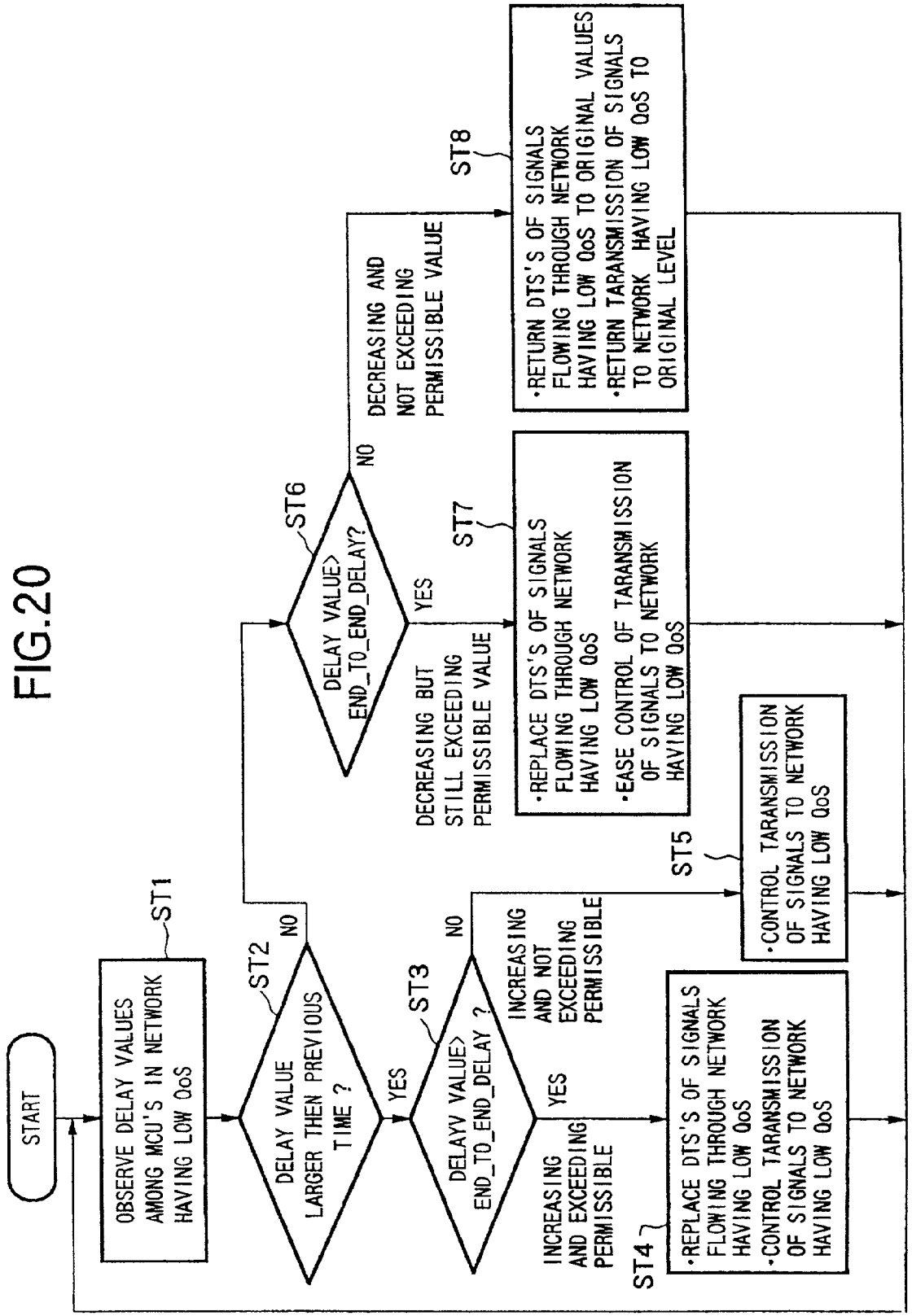

DATA TRANSMISSION METHOD AND DATA TRANSMISSION SYSTEM

RELATED APPLICATION DATA

The present application claims priority to Japanese Application No. P2000-081851 filed Mar. 17, 2000, which application is incorporated herein by reference to the extent permitted by law.

BACKGROUND OF THE INVENTION

The present invention relates to a data transmission method and a data transmission system for transmitting a plurality of streams over a network when communicating, streaming, etc. among a plurality of terminals.

Below, an explanation will be made of a conventional method for transmitting a plurality of streams over a network when communicating, streaming, etc. among a plurality of terminals in relation to the drawings.

FIG. 1 is a view of an example of a television (TV) conference system.

In this TV conference system, a conference is simultaneously carried out by using five terminals of a terminal 1 to a terminal 5 with cameras CMR mounted thereon.

The terminals 1 to 5 are connected via switches SW1 to SW4, routers RT1 to RT3, and an ISDN network NTW1.

The signals (video and audio) from the terminals 1 to 5 are assembled at a multipoint control unit (MCU) 6 where they are combined to the signal to be reproduced at each terminal.

The MCU 6 has mainly two functions. One is that of a block of a multipoint controller (MC) 6A for controlling which terminals are attending the conference, while the other is that of a multipoint processor (MP) 6B for combining signals assembled from multiple points for every terminal.

FIGS. 2A and 2B are views of the structure of data flowing over the network and an amount of transmission in the TV conference system of FIG. 1.

As shown in FIG. 2A, signals (A1, V1) transmitted from the terminal 1 pass through the switch SW1, router RT1, ISDN network NTW1, router RT2, and switch SW4 to be transmitted to the MCU 6.

Similarly, the signals transmitted from the terminals 2, 3, 4, and 5 are transmitted to the MCU 6. The signals assembled at the MCU 6 are combined as follows for every terminal.

Terminal 1: (A2-3-4-5, V2-3-4-5)
Terminal 2: (A1-3-4-5, V1-3-4-5)
Terminal 3: (A1-2-4-5, V1-2-4-5)
Terminal 4: (A1-2-3-5, V1-2-3-5)
Terminal 5: (A1-2-3-4, V1-2-3-4)

Here, A denotes audio, and V denotes video. Further, (,) of (A1,V1) indicates that each signal is separated, and (-) of (A1-2-3-4) indicates that the signals are combined.

"Combined" means that the signals are added in a baseband state (for example PCM) in the case of the audio.

In the case of the video, it means that the signals are combined to one having the same image size by reducing the sizes of the images in the baseband (pixel) state and joining the plurality of images with each other in one frame.

The data structure of the signal flowing over the network shown in FIG. 2A becomes as shown in FIG. 2B.

Namely, the data has the same amount of information before and after the composition. The audio and video are formed into different packets and multiplexed (MUX) in packet units. Further, data is also multiplexed in addition to the audio and video.

When arranged in this way, it is understood that, as the amount of information of the signals flowing over the network of the TV conference system, signals of 20 times the data structure flow in all layers.

Next, a case where the TV conference system is applied to wireless telephones will be considered.

FIG. 3 is a view of the topology in the case where the TV conference system is applied to wireless telephones. In other words, FIG. 3 is a view of an example of the configuration of multipoint communication. In this example as well, the case where five terminals MT (Mobile Terminal) 1 to MT5 communicate is shown.

The terminals MT1 to MT5 are connected via mobile base stations (MBS) 11A to 11D arranged in the network, mobile switching centers (MSC) 13A to 13C with the MCUs 12A to 12C connected thereto, and further gateway mobile switching centers (GMSC) 14A to 14E having home location registers (HLR).

The center portion is a network wherein the GMSCs 14A to 14E are connected in a so-called mesh state (for example circuit switched network or a packet switching network).

A great difference from the TV conference system resides in that there are many MCUs in the network, and the MCU located nearest each terminal multiplexes the signals of the multiple points.

That is, in the MCU, in the same way as the time of the TV conference, there are the function of an MC and the function of an MP. However, one MC among the plurality of MCUs controls one communication, while a plurality of MPs are controlled by this one MC and perform the multiplexing.

FIGS. 4A and 4B are views of the structure of the data flowing in the network and the amount of transmission in the multipoint communication of FIG. 3.

As shown in FIG. 4A, unlike the TV conference system, there are a plurality of MCUs, so the signals of the multiple points must all be transferred to a plurality of MCUs 12A to 12C. Accordingly, the signals (A1,V1) transmitted from for example the terminal MT1 are transmitted to the MCU 12A, MCU 12B, and MCU 12C.

The data structure of the signals (A1, V1) becomes as shown in FIG. 4B. The channel is narrow, so, unlike the time of the TV conference system, the image sent from each terminal is transmitted matching with the size after composition.

Further, when looking at the MCU 12A, two patterns are combined in the following way from the collected five signals for the terminals MT1 and MT2:

MT1: (A2-3-4-5, V2-3-4-5)
MT2: (A1-3-4-5, V1-3-4-5)

The data structure of this signal is indicated by numeral 15 in FIG. 4B. This becomes the same as the combined one in the TV system. Note, due to a difference of thicknesses of the wireless or other channels, the size of the images, quality of audio, etc. are different from those of the TV conference utilizing an ISDN network.

In this way, behind the existence of the GMSCs, since the composed signals do not flow over the network, the structure of the data flowing at this layer becomes the format as indicated by reference numeral 16 in FIG. 4B. The amount of transmission also becomes 15 times this data structure.

In this way, it is understood that the amount of the data flowing over the entire network is improved a little in comparison with the TV conference by arranging a plurality of MCUs.

Further, by giving the terminal side the function of simultaneously decoding a plurality of streams, the MCU side can multiplex the data in packet units without composition at the baseband level. This situation will be shown in FIGS. 5A and 5B.

In this case, looking at the MCU 12A, the signals combined for the terminals MT1 and MT2 become as follows:

MT1: (A2, 3, 4, 5, V2, 3, 4, 5)
MT2: (A1, 3, 4, 5, V1, 3, 4, 5)

This data structure becomes as shown in FIG. 5B. The example of FIG. 5B shows the situation where the data is multiplexed in packet units.

Next, an explanation will be given of the operation of an MCU in multipoint communication.

FIG. 6 is a view of an example of the configuration of a conventional MCU used for multipoint communication.

Note that, in this example, the explanation will be made treating the three existing MCUs as one MCU 12.

There is a time difference by which each of the signals collected from the terminals MT1 to MT5 reach the MCU 12.

In order to make these constant, the MCU 12 inserts delay units DLY1 to DLY5 for the signals to match their phases, then demultiplexes the plurality of signals at the demultiplexers DMX1 to DMX5 provided in the MP, passes them through a switcher (buffer) BF, and combines them at the multiplexers MX1 to MX5 for every terminal.

This delay amount and the demultiplexing and multiplexing at the MP are performed according to instructions of the MC.

Next, how this delay time is controlled will be explained.

FIGS. 7A, 7B and 7C and FIGS. 8A, 8B and 8C are views for explaining a situation where the video and audio are encoded and decoded.

(Explanation of Video Encoding)

First, an explanation will be made of the video encoding in relation to FIG. 7A.

1) in FIG. 7A indicates a vertical synchronization signal V Sync. The bold lines represent frames. This frame is an access unit of the video. Generally, this is used as the unit for compression of the amount of information. Further, according to the method of compression, there may be I-pictures and P-pictures. An I-picture is a picture compressed utilizing the correlation with a frame, while a P-picture is a picture compressed utilizing the correlation among frames. The numerals after the picture type indicate the sequence of input frames.

The picture input as in 2) in FIG. 7A is encoded at a time 4).

5) in FIG. 7A indicates the image of the buffer existing inside the encoder. An inverse form to a virtual decoder buffer (VBV buffer) is described rather than the operation of the actual buffer. This corresponds to a virtual buffer existing inside a controller for controlling the rate.

Accordingly, this buffer is instantaneously generated when the encoding is terminated. The bold line shows this situation.

3) in FIG. 7A indicates the value of an STC (system time clock) when each access unit of the video is input to the encoder. This STC illustrates an absolute clock in a telephone network. All systems and terminals are assumed as operating with the same clock and time.

6) in FIG. 7A indicates an STS (decoding time stamp) which indicates the timing when the access unit finished being encoded at 5) starts being decoded at the reproduction side.

This value is transmitted together when the access units of the video are formed into packets and multiplexed. Accordingly, for 10 pictures, a value such as STC_V6 is transmitted. When the system reaches this time, the decoding is started.

(Explanation of Encoding of Audio Related Information)

Next, an explanation will be made of the audio encoding in relation to FIG. 7B and FIG. 8A.

In audio, unlike video, there is no concept of discrete access units such as frames. However, the audio is fetched in the form of access units for every certain number of sample number.

8) in FIG. 7B and FIG. 8A show the situation where an AAU (audio access unit) is input into the encoder. 7) is the time when the AAU is input. 9) is the time when the encoding is actually carried out, while 10) indicates the situation where data is generated in the virtual buffer at the instant when the encoding is completed. 11) is the timing when each AAU is decoded. This value is multiplexed together with the AAU and transmitted to the decoder side.

(Explanation of Video Decoding)

Next, an explanation will be made of the video decoding in relation to FIG. 7C and FIG. 8B.

The bit stream (compressed signal) generated in the buffer in 5) of FIG. 7A starts to be transmitted while the state of the buffer on the decoder side is monitored. The data is accumulated in the decoder buffer.

This situation is shown in 12) of FIG. 7C and FIG. 8B. Here, the state of the virtual buffer (VBV buffer) is illustrated.

13) of FIG. 7C and FIG. 8B indicate the timing when the decoding is carried out matching with the time of the STC of 15). Here, it is supposed that the decoding is ideally instantaneously completed and, simultaneously with the completion of the decoding, the data is output as shown in 14).

Here, the time from the instant when the signal is input to the encoder (terminal) to when the signal is output from the decoder (terminal) is defined as the end-to-end delay. Namely, that time is shown in 15) of FIG. 7C and FIG. 8B. This becomes the same in all access units both video and audio.

The state where the video and audio become out of phase is defined as "lip-sync deviation". Deviation between the same video or between the same audio is defined as "jitter".

(Explanation of Decoding of Audio Related Information)

Next, an explanation will be made of the audio decoding in relation to FIG. 8C.

As shown in 16) in FIG. 8C, the audio is transmitted with a delay so as to match the end-to-end-delay of the video. The data is accumulated in the decoder buffer.

The timing of decoding is determined for every AAU shown in 17) matching with the value of the STC of 19) in FIG. 8C. The decoding is instantaneously completed matching with this. The data is output from the decoder immediately after that.

As described above, the information concerning the video and audio are synchronized by transmitting a time stamp such as a DTS. Further, they are controlled so that no underflow or overflow of the buffer occurs in the system.

By utilizing the DTS shown in FIGS. 7A to 7C and FIGS. 8A to 8C, it is possible to achieve synchronization among multiple points. This situation is shown in FIG. 9.

In the example of FIG. 9, the signals of the terminals MT1 and MT2 reach the MCU 12A without through the GMSC 14.

Contrary to this, the signals of the terminals MT3, MT4, and MT5 reach the MCU 12A after passing through the GMSC 14.

Accordingly, it is learned that the signals of the terminal MT3 (T3-AU1, AU2), terminal MT4 (T4-AU1, AU2), and terminal MT5 (T5-AU1, AU2) arrive delayed in comparison with those of the terminal MT1 (T1-AU1, AU2) and the terminal MT2 (T2-AU1, AU2) as shown in the situation of the time difference of the packets transmitted from the terminals indicated by symbol TM1 in FIG. 9.

The MCU 12A analyzes this DTS from each packet, controls the delay units in the MCU to match the phases of the signals from the terminals, then multiplexes and combines the signals.

In this way, it becomes possible to make the phases of the signals from all of the terminals completely match at each of the terminals MT1 and MT2 as shown in the situation of reproduction and display at each terminal shown by the reference symbol TM2 in FIG. 9.

Further, in recent years, Internet telephone and other services using the Internet have been started.

In the Internet, the band is often not compensated. Therefore, it is an area where the quality of service (QoS) is low. When using such a network, it is necessary to monitor the state of congestion and control a signal to be transmitted to the network in accordance with the state of congestion.

FIG. 10 is a view of an example of the configuration of a multipoint communication system utilizing only a network having a low QoS.

As a network having a low QoS, here, the case of utilizing the Internet is shown.

In FIG. 10, the terminals are indicated by MT1 to MT4 in the same way as the above. Further, 21A to 21C denote MBSs, 22A and 22B denote MSCs, 23A and 23B denote MCUs, 24A and 24B denote packet switching networks, 25A and 25B denote Internet exchanges (IX), and 26 denotes the Internet.

The signals rising from the terminals are all transmitted to the packet switching networks 24A and 24B at the MSCs 22A and 22B. Here, the MCUs 23A and 23B for multiplexing the signals of the multiple points are arranged in this packet switching networks.

The MCU 23A preparing the signals to be transmitted to the terminals MT1 and MT2 receives the signals from the terminals MT1, MT2, MT3, and MT4, multiplex them, and send them to the terminals MT1 and MT2.

Here, the data of the terminals MT3 and MT4 are transmitted through the Internet 26, so the transmission delay is greatly influenced in accordance with the state of congestion of the network.

At this time, in order to confirm the congestion, an RTCP (real-time control protocol) is utilized to monitor the RTT (round trip time).

When the RTT widely fluctuates by more than the amount of allowable end-to-end jitter, the amount of the data transmitted over the network is controlled to ease the congestion state so as to avoid congestion.

Summarizing the problem to be solved by the invention, there are the following problems.

(Problem 1)

Conventionally, all of the signals of the multiple points have been gathered at the MCU (multipoint control unit) for combining the signals of the multiple points which then composed the signals required for each terminal. For this reason, many signals had to be transmitted over the network.

(Problem 2)

Conventionally, when combining signals of multiple points, in order to match the times of the signals of the multiple points, the times taken for the transfer were canceled and the phases matched by inserting delay. In order to realize this, delay units compensating for large delays were necessary.

(Problem 3)

When transferring a plurality of signals such as video and audio signals among two or more multiple points, signals of more importance and signals of less importance from the viewpoint of the continuity of the signals are frequently mixed together among these plurality of signals.

For example, when comparing the video and audio, the continuity is more important in the audio.

These signals are transmitted over bands having the same QoS, so the transmission cost becomes high.

Further, from the viewpoint of effective utilization of the bands, the utilization efficiency was low.

(Problem 4)

When utilizing different bands, a plurality of signals (for example audio and video) are transmitted through a plurality of transmission lines. At this time, since the delay values of the signals flowing over the transmission lines are different, if the signals are recombined as they are, a plurality of signals will end up out of phase. In the case of audio and video, this will result in lip-sync deviation and an extremely strange feeling. In some cases, the signals could become even more out of phase than with lip-sync deviation.

(Problem 5)

When communicating by utilizing only a network having a low QoS, there is a possibility of large jitters or large delay occurring in accordance with the state of congestion of the network.

In order to enlarge the permissible value of such jitter in the network, a large delay unit (buffer) becomes necessary somewhere in the system. In one-way streaming, delivery of a continuous signal is made possible by this method.

Further, if a large delay is inserted, in the communication, a deviation occurs in the responses to each other and conversation ends up becoming impossible.

Further, if a state of congestion occurs in the network, the audio will be interrupted. Not only it is then difficult to use this system as a communication tool, but also there is the problem that once congestion occurs, the system cannot be restored for a long time.

SUMMARY OF THE INVENTION

An object of the present invention is to provide a data transmission method and a data transmission system capable of reducing traffic of signals flowing over the entire network.

A second object of the present invention is to provide a data transmission method and a data transmission system not requiring a large delay unit in the MCU performing the multiplexing and composition and therefore capable of reducing the hardware size.

A third object of the present invention is to provide a data transmission method and a data transmission system achieving an improvement of a utilization efficiency of the transmission bands and a reduction of the transmission cost.

A fourth object of the present invention is to provide a data transmission method and a data transmission system capable of synchronizing a plurality of signals transmitted over different bands.

A fifth object of the present invention is to provide a data transmission method and a data transmission system capable of avoiding the trouble of enormous amount of signals being accumulated in the transmission line and the data not being updated for a long time.

According to a first aspect of the invention, there is provided a data transmission method for transmitting video data and audio data among multiple points from a plurality of terminals arranged in a network, comprising transmitting the video data by multiplexing it as a stream encoded for every point and transmitting the audio data by combining at least one audio signal in a baseband in the network.

According to a second aspect of the invention, there is provided a data transmission method for transmitting data among multiple points from a plurality of terminals arranged in a network, comprising shifting data in accordance with transmission delays when transmitting data at multiple points to the terminals.

In the present invention, identical packets are transmitted given different time stamps in accordance with the transmission delays in the network.

According to a third aspect of the invention, there is provide a data transmission method for transmitting a plurality of data streams among multiple points from a plurality of terminals arranged in a network, comprising transmitting each of the plurality of data streams through a network having a different property and recombining them after transmission over the networks and transmitting them to the terminals.

Preferably, when a network having a superior property is defined as a master network, and the others are defined as slave networks, the delay values of the slave networks are monitored based on the master network as the standard and the transmission of data through a slave network is restricted when that slave network has more than a certain delay in comparison with the master network.

Further, preferably, when restricting the transmission of data to a slave network, if the data transmitted over the slave network employs a compression method utilizing correlation among access units, the data transmitted to the network is controlled for every unit of interruption of the correlation.

Further, in the present invention, when restricting the transmission of data to a slave network, data for restricting a frame rate and a bit rate is transmitted from the network to the terminals.

According to a fourth aspect of the invention, there is provided a data transmission method for transmitting a plurality of data streams having different degrees of importance among multiple points from a plurality of terminals arranged in a network, comprising demultiplexing the plurality of data streams having different degrees of importance in the middle of the transmission line, transmitting data where continuity is regarded as important through a network having a higher quality of service, transmitting data for which discontinuity is permitted through a network having a lower quality of service, combining the plurality of data transmitted through the different networks again before the data arrive at the destination terminals, and transmitting the same to the terminals.

According to a fifth aspect of the invention, there is provided a data transmission system for transmitting video data and audio data among multiple points from a plurality of terminals arranged in a network, comprising a device for transmitting the video data by multiplexing it as a stream encoded for every point and transmitting the audio data by combining at least one audio signal in a baseband in the network.

According to a sixth aspect of the invention, there is provided a data transmission system for transmitting data among multiple points from a plurality of terminals arranged in a network, comprising a device for shifting data in accordance with transmission delays when transmitting data at multiple points to the terminals.

In the present invention, the device transmits identical packets given different time stamps in accordance with the transmission delays in the network.

According to a seventh aspect of the invention, there is provided a data transmission system for transmitting a plurality of data streams among multiple points from a plurality of terminals arranged in a network, comprising a plurality of networks having different properties, a first device for transmitting each of the plurality of data streams through a network having a different property, and a second device for recombining them after transmission over the networks and transmitting them to the terminals.

Preferably, when a network having a superior property is defined as a master network, and the others are defined as slave networks, the first device monitors delay values of the slave networks based on the master network as the standard and restricts the transmission of data through a slave network when that slave network has more than a certain delay in comparison with the master network.

Further, preferably, when restricting the transmission of data to a slave network, if the data transmitted over the slave network employs a compression method utilizing correlation among access units, the first device controls the data transmitted to the network for every unit of interruption of the correlation.

Further, in the present invention, when restricting the transmission of data to a slave network, the first device transmits data for restricting a frame rate and a bit rate from the network to the terminals.

According to a eighth aspect of the invention, there is provided a data transmission system for transmitting a plurality of data streams having different degrees of importance among multiple points from a plurality of terminals arranged in a network, comprising a first network having a higher quality of service, a second network having a lower quality of service than the first network, a first device for demultiplexing the plurality of data streams having different degrees of importance in the middle of the transmission line, transmitting data where continuity is regarded as important through the first network, transmitting data for which discontinuity is permitted through the second network, and a second device for combining the plurality of data transmitted through the different networks again before the data arrive at the destination terminals and transmitting the same to the terminals.

According to the present invention, when combining and transmitting a plurality of data (signals), the system adds only the information concerning the audio at the baseband (PCM) to obtain a signal of one channel. It transmits the video by bundling a plurality of channels while keeping the packet form.

At that time, the information concerning the audio is greatly reduced in size by assembling the same in one channel. Note that, in the video, since the amount of information is determined in accordance with the image size, even if the images are returned to the baseband and combined, the amount of information is not reduced. On the contrary, a high performance is required in order to return the images to their original form and combine them.

Further, by sending the data signals as described above to each other when transferring the data required for multiplexing, the amount of information of the signals flowing among the MCUs is reduced.

Further, when transmitting the multiplexed signals to the terminals, by adding only the information concerning the audio at the baseband (PCM) and transmitting signals multiplexed by bundling a plurality of channels as the video while keeping the packet form, the amount of information flowing over the transmission lines is reduced.

Due to this, the traffic of the signals flowing over the entire network can be reduced.

Further, according to the present invention, the data transmitted from the multiple points are deliberately shifted in accordance with the transmission delays for reproduction and display instead of matching the phases of the signals input to the terminals at the same time.

In this case, when for example transmitting the same access units to a plurality of multipoint control devices, they are transmitted by adding different delay values to the time stamps in accordance with the transmission delays.

Further, according to the present invention, a plurality of data signals having different degrees of importance (for example the video and the audio) are demultiplexed in the middle of the transmission lines, the signals where continuity is regarded as important (for example, information concerning the audio) are transmitted through the network having a higher QoS (quality of service), while signals for which discontinuity can be permitted (for example video) are transmitted through the network having a lower QoS.

Further, before the signals arrive at the destination terminals, they are recombined and delivered to the terminals.

Further, the signals transmitted through the network having a high QoS (for example the audio) are used as the reference, and the signals transmitted through the network having a lower QoS (for example the video) are multiplexed and combined matching with the display time of the former and transmitted to the target terminals.

Further, according to the present invention, where the signals transmitted over the network having a lower QoS (for example the video) are delayed more than a certain predetermined level in comparison with the signals transmitted over the network having a high QoS (for example the audio), the timing of the display is shifted on the receiver side. For this purpose, the value of the time stamp (for example DTS) is delayed by that amount.

Further, where the signals transmitted over the network having a lower QoS (for example the video) are delayed more than a certain predetermined level in comparison with the signals transmitted over the network having a high QoS (for example the audio), the transmission to the network is restricted on the transmitter side.

As the method for control, there are a method of lowering the bit rate and a method of lowering the frame rate.

Further, when the congestion of the network having a low QoS is not eased, the end-to-end delay of the system is delayed.

BRIEF DESCRIPTION OF THE DRAWINGS

These and other objects and features of the present invention will become clearer from the following description of the preferred embodiments given with reference to the accompanying drawings, in which:

FIGS. 4A and 4B are views of the structure of the data flowing in the network in the multipoint communication of FIG. 3 and the amount of transmission;

FIGS. 5A and 5B are views of another example of the structure of the data flowing in the network in the multipoint communication of FIG. 3 and the amount of transmission;

FIG. 6 is a view of an example of the configuration of a conventional MCU used for multipoint communication;

FIGS. 7A to 7C are views for explaining a situation where a video and an audio are encoded and decoded;

FIGS. 8A to 8C are views for explaining the situation where a video and an audio are encoded and decoded;

FIGS. 14A and 14B are views for explaining the second embodiment of the data transmission system employing the data transmission method according to the present invention, in which FIG. 14A is a view of an example of the configuration of a data transmission system 40 in a case where such multiplexed signals are transmitted among MCUs and between the MCU and the terminals, and FIG. 14B is a view of a data structure and an amount of transmission in the system of FIG. 14B;

FIGS. 15A and 15B are views for explaining the second embodiment of the data transmission system employing the data transmission method according to the present invention, in which FIG. 15A is a view of an example of the configuration of a data transmission system 40A in a case where the multiplexed signals are transmitted among MCUs and between the MCU and the terminals, and the MCU is not a layer of an MSC, but the layer of a GMSC, and FIG. 15B is a view of a data structure and an amount of transmission in the system of FIG. 15A;

FIGS. 19A to 19C are explanatory views of monitoring and control of a transmission delay according to a fourth embodiment; and FIG. 20 is a flowchart of monitoring and control of the transmission delay according to the fourth embodiment.

DESCRIPTION OF THE PREFERRED EMBODIMENTS

Below, preferred embodiments will be described with reference to the accompanying drawings.

First Embodiment

Figure 11:
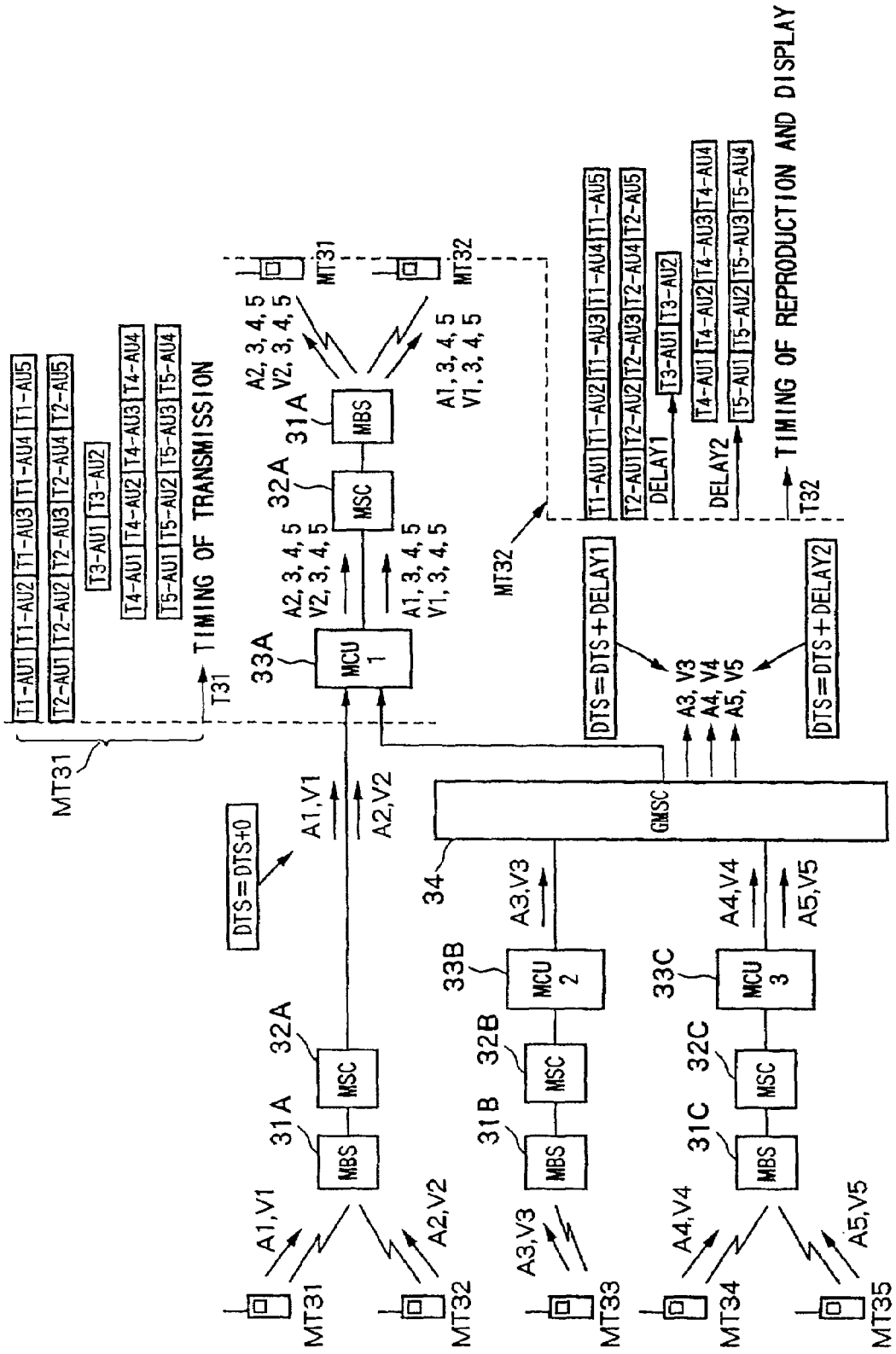
FIG. 11 is a view for explaining a first embodiment of a data transmission system employing a data transmission method according to the present invention and a view of a signal transmission state of a case of multipoint communication.
Figure 12:
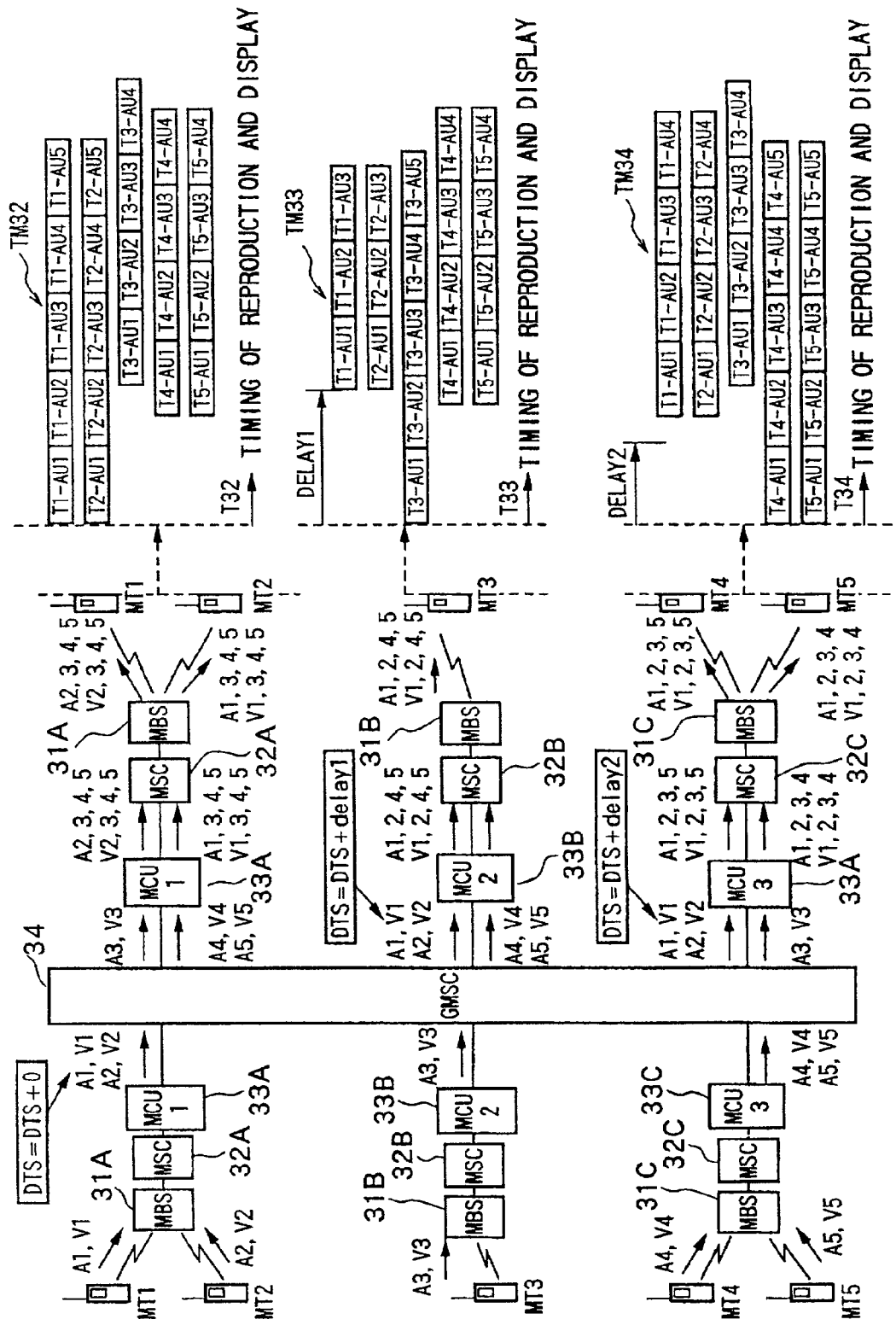
FIG. 12 is a view for explaining the first embodiment of the data transmission system employing the data transmission method according to the present invention and a view of a state where signals in the case of multipoint communication are reproduced and displayed at terminals.

FIG. 11 and FIG. 12 are views for explaining a first embodiment of a data transmission system employing a data transmission method according to the present invention. FIG. 11 shows a signal transmission state in a case of multipoint communication, while FIG. 12 shows a state where the signals in the case of multipoint communication are reproduced and displayed at the terminals.

A data transmission system 30 according to the first embodiment is configured based on the following characteristics.

1) The signals transmitted from multiple points are deliberately shifted for reproduction and display in accordance with the transmission delays instead of matching the phases of the data (signals) input to the terminals at the same time.

2) In order to realize 1), when transmitting the same access units to a plurality of MCUs (multipoint control devices), different delay values are added to the DTS (decoding time stamp) in accordance with the transmission delays and transmitted.

In FIG. 11 and FIG. 12, MT31 to MT35 denote mobile terminals (hereinafter, simply referred to as terminals), 31A to 31C denote MBSs (mobile base stations), 32A to 32C denote MSCs (mobile switching centers), 33A to 33C denote MCUs, and 34 denotes the gateway mobile switching center (GMSC).

FIG. 11 shows the situation when the signals of the terminals MT31 to MT35 are transmitted to the MCU 33A.

Specifically, an audio signal A1 and a video signal V1 from the terminal MT31 and an audio signal A2 and a video signal V2 from the terminal MT32 pass through the MBS 31A and the MSC 32A, but do not pass through the GMSC 34, and arrive at the MCU 33A.

As opposed to this, an audio signal A3 and a video signal V3 from the terminal MT33 pass through the MSB 31B, MSC 32B, and the MCU 33B, an audio signal A4 and a video signal V4 from the terminal MT34 and an audio signal A5 and a video signal V5 from the terminal MT35 pass through the MSB 31C, MSC 32C, and the MCU 33C and further pass through the GMSC 34 and arrive at the MCU 33A.

Further, the portion indicated by the symbol MT31 of FIG. 11 indicates the situation of the time difference of the packets transmitted from the terminals MT31 to MT35. (T1-AU1, T1-AU2, . . . , T1-AU5) denote packet signals from the terminal MT31, (T2-AU1, T2-AU2, . . . , T2-AU5) denote packet signals from the terminal MT32, (T3-AU1, T3-AU2) denote packet signals by the terminal MT33, (T4-AU1, T4-AU2, . . . , T4-AU4) denote packet signals from the terminal MT34, and (T5-AU1, T5-AU2, . . . , T5-AU4) denote packet signals from the terminal MT35.

Note that, T31 denotes the timing of the transmission of each packet signal.

Further, the portion indicated by the symbol MT32 in FIG. 11 indicates the situation where the transmitted packet signals are reproduced at the terminals MT31 and MT32 and displayed.

Note that, T32 denotes the timing of reproduction and display.

In the data transmission system 30 having the above configuration, in the MCU 33B, the signals (A3, V3) of the terminal MT33 transmitted from the MCU 33B to the MCU 33A are transmitted delayed by exactly the delay 1.

For this reason, the value of the DTS of the signals (A3, V3) transmitted to the MCU 33A is set up as follows.

$$DTS = DTS + delay\ 1$$

Note that since a transmission line having a high QoS is assumed, the delay value is known in advance.

Similarly, in the MCU 33C, the values of the DTSs of the signals (A4, V4), (A5, V5) of the terminals MT34 and MT45 transmitted from the MCU 33C to the MCU 33A are replaced as follows.

$$DTS = DTS + delay\ 2$$

By this, in the MCU 33A, it becomes possible to multiplex the signals sent from the terminals MT33, MT34, and MT35, without delaying the signals sent from the terminals MT31 and MT32, and send them out via the MSC 32A and MBS 31A. They are reproduced and displayed at the terminals MT31 and MT32 according to the designated times.

Similarly, the situation of the reproduction and display at the terminals MT31 to MT35 is shown in FIG. 12.

In FIG. 12, the portion indicated by the symbol MT32 indicates the situation where the signals are reproduced and displayed at the terminals MT31 and MT32, the portion indicated by the symbol MT33 indicates a situation where the signals are reproduced and displayed at the terminal MT33, and the portion indicated by the symbol MT34 indicates a situation where the signals are reproduced and displayed at the terminals MT34 and MT35.

Note that, T32 to T34 denote the timings of the reproduction and display.

In the example of FIG. 12, the timing when the packet signals (T1-AU1, T1-AU2, . . . T1-AU5) of the terminal MT31 are displayed differs according to the terminal.

In order to realize this, the signals (A1, V1) of the terminal MT31 sent from the MCU 33A to the MCU 33A (MCU 1), MCU 33B (MCU 2), and MCU 33C (MCU 3) are transmitted so that the DTSs are replaced by the following three types according to the delay values of the transmission lines.

MCU 1→MCU 1:DTS=DTS+0
MCU 1→MCU 2:DTS=DTS+delay1
MCU 1→MCU 3:DTS=DTS+delay2

Note that, in FIG. 12, each of the MCU 33A, MCU 33B, and MCU 33C is shown divided into two, but physically the parts are the same. Accordingly, a signal transmitted to itself will not pass through the GMSC 34.

In this way, according to the present first embodiment, even for the same signals, the display times at the terminals can be controlled by controlling the DTSs in accordance with where are they transmitted. By this, in each MCU, the multiplexing can be simply and smoothly achieved.

Further, a signal from a near position can be output in the shortest time. Quick display of even a signal from a far position is enabled after only the transmission delay.

According, overall, communication with the shortest delay value becomes possible.

Second Embodiment

FIGS. 13A to 13E, FIGS. 14A and 14B, and FIGS. 15A and 15B are views for explaining a second embodiment of a data transmission system employing a data transmission method according to the present invention.

A data transmission system 30A according to the second embodiment is configured based on the following characteristics.

1) When combining and transmitting a plurality of signals, only the information concerning the audio is added at the baseband (PCM) to obtain a signal of one channel. The video is transmitted by bundling a plurality of channels while keeping the packet form.

2) When transferring the data required for the multiplexing among the MCUs, by sending the signals as in 1) to each other, the amount of information of the signals flowing among the MCUs is reduced.

3) When transmitting the multiplexed signals from the MCU to the terminals, by transmitting the signals multiplexed as in 1), the amount of the information flowing through the transmission lines is reduced.

4) By combining 2) and 3), the traffic of the signals flowing over the entire network can be reduced.

FIGS. 13A to 13E are views of the situation when adding the information concerning the audio at the baseband.

Figure 13:
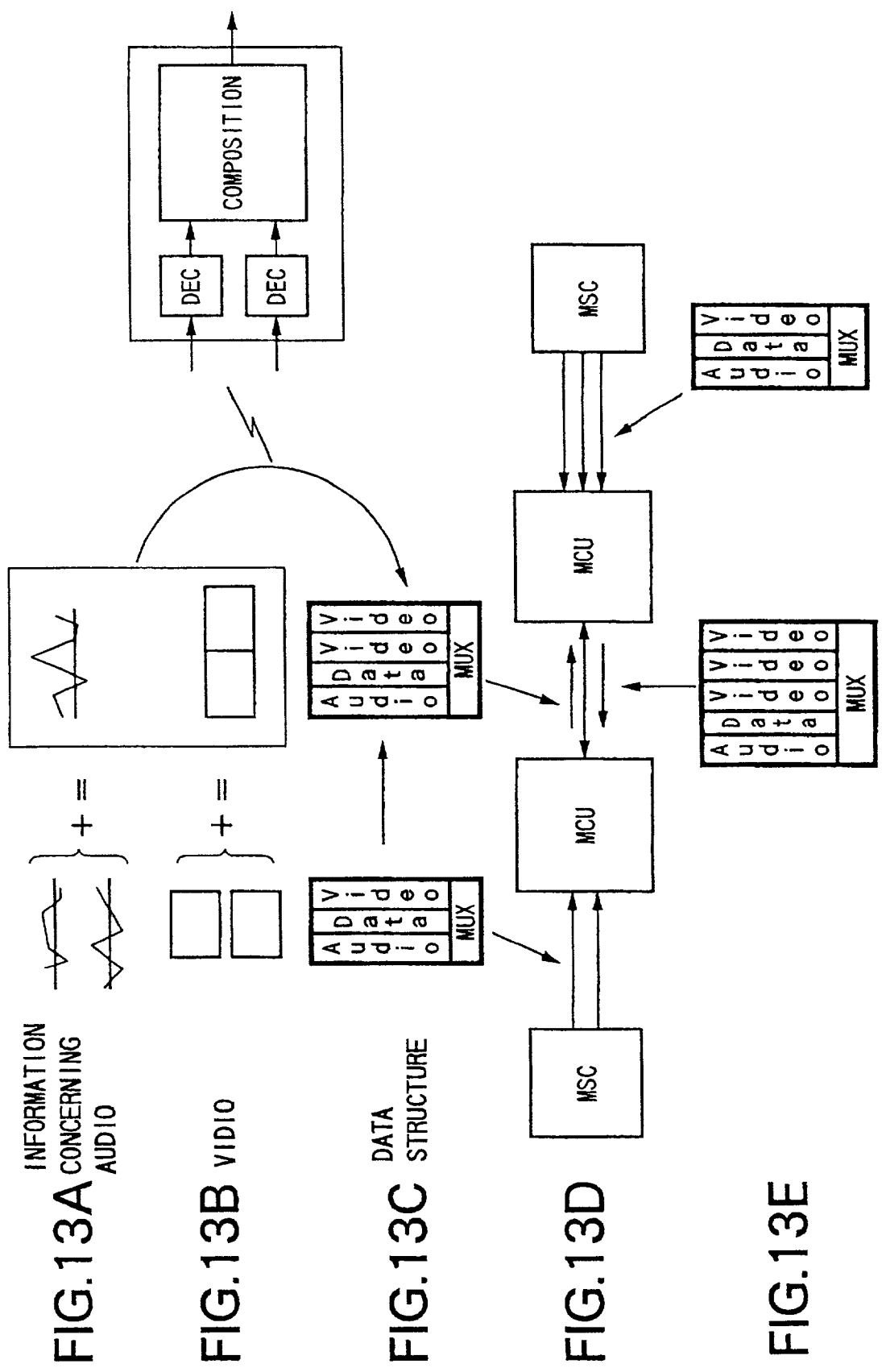
FIGS. 13A to 13E are views for explaining a second embodiment of the data transmission system employing the data transmission method according to the present invention and a view of the situation of adding information concerning an audio at a baseband.

FIG. 13A shows the information concerning the audio, FIG. 13B shows the video information, FIGS. 13C and 13E show the data structures, and FIG. 13D shows the flow of the signals.

As shown in FIG. 13A, by adding the audio, audio of a plurality of channels can be converted to one channel. When it is not necessary to demultiplex and reproduce the same later, the amount of information can be reduced by combining them.

In the video, spatial information cannot be superposed at the same position. Therefore, it is possible to view it by putting together the videos.

However, the amount of information is greatly influenced by the image size. Therefore, even if they are combined at the baseband, the amount of information does not change so much.

Therefore, in the video, as shown in FIG. 13B, the signals are multiplexed in packet units as encoded.

In this way, when transmitting the signals fetched into the MCUs to each other among the MCUs, by transmitting them in such a combined state, the amount of the information flowing through the network is reduced and thus the traffic can be reduced.

Further, even when transmitting the signals from the MCU to the terminals, by performing similar multiplexing, the amount of the information flowing over the transmission lines can be reduced.

Figure 14:
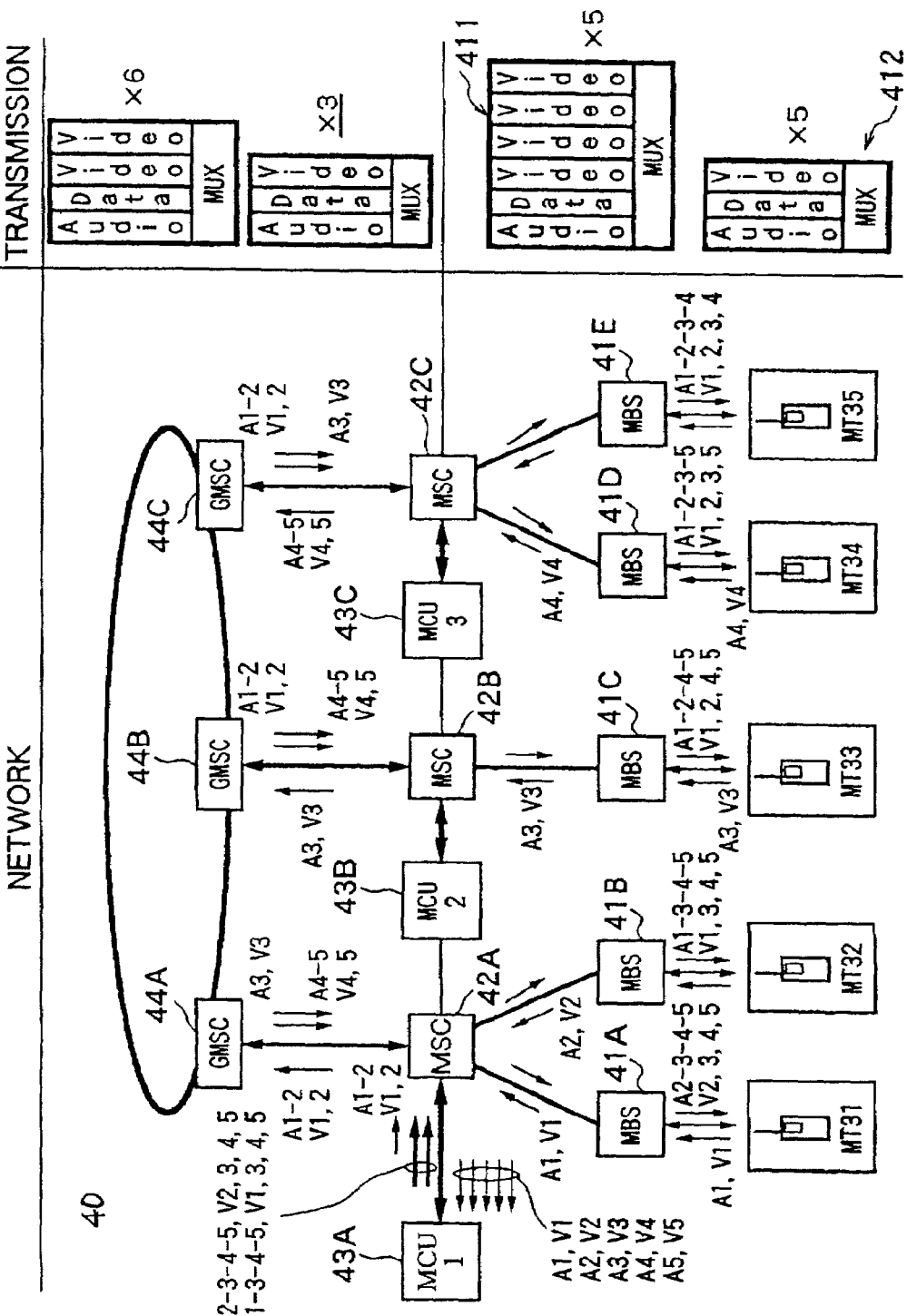

FIG. 14A is a view of an example of the configuration of a data transmission system 40 in a case when transmitting such multiplexed signals among the MCUs and between the MCU and the terminals described above, while FIG. 14B shows the data structure and the amount of transmission in the system of FIG. 14A.

In the data transmission system 40 of FIG. 14A, the terminals are indicated by the symbols MT31 to MT35 in the same way as FIG. 11 and FIG. 12.

Further, in FIG. 14A, 41A to 41E denote MBSs, 42A to 42C denote MSCs, 43A to 43C denote MCUs, and 44A to 44C denote GMSCs.

Further, the MBSs 41A and 41B, MCU 43A, and GMSC 44A are connected to the MSC 42A, the MBS 41C, MCU 43B, and GMSC 44B are connected to the MSC 42B, and the MBS 41D, MBS 41E, MCU 43C, and the GMSC 44C are connected to the MSC 42C.

In the data transmission system 40 of FIG. 14A, when looking at the MCU 43A, the signals (A1, V1) of the terminal MT31 and the signals (A2, V2) of the terminal MT32 are multiplexed (A1-2, V1, 2), that is, transformed to the data structure as indicated by a symbol X6 in FIG. 14B, pass through the GMSCs 44A to 44C, MSC 42B, and MSC 42C, and are transmitted to the MCU 43B and the MCU 43C.

Further, for the terminals MT31 and MT32, the signals are transformed to (A2-3-4-5, V2, 3, 4, 5) and (A1-3-4-5, V1, 3, 4, 5), that is, the data structure as indicated by numeral 411 in FIG. 14B, and transmitted.

In this way, in the data transmission system 40, the amount of transmission of the data flowing through the network is reduced in comparison with the conventional data transmission system shown in FIG. 4A.

Figure 15:
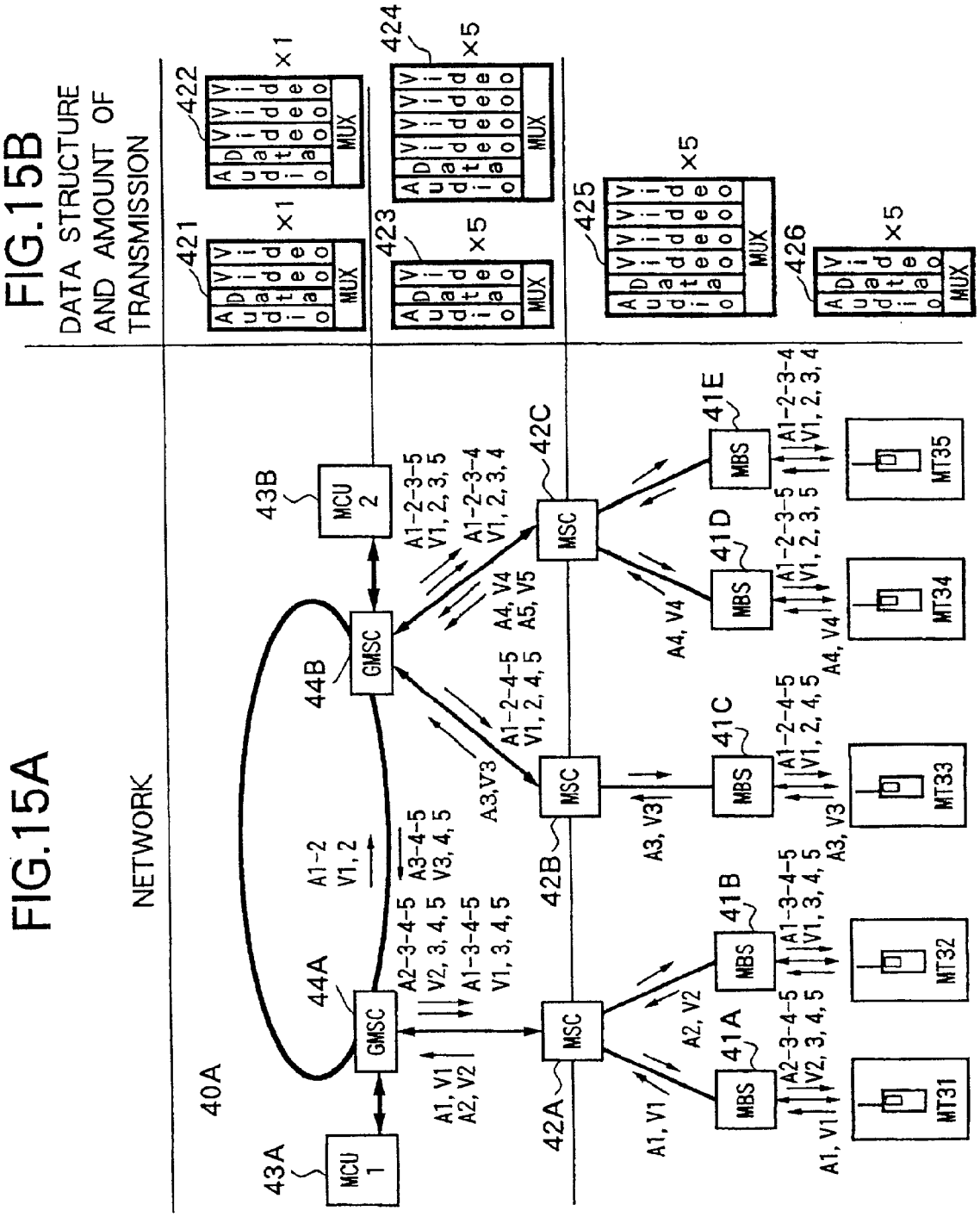

Further, FIG. 15A shows the case where the multiplexed signals are transmitted among the MCUs and between the MCU and the terminals as described above and shows an example of the configuration of a data transmission system 40A in a case where the MCU is not a layer of the MSC, but the layer of the GMSC, while FIG. 15B shows the data structure and the amount of transmission in the system of FIG. 15A.

The transfer of the data between the MCU 43A (MCU 1) and the MCU 43B (MCU 2) in the data transmission system 40A of FIG. 15A becomes as follows.

MCU 1→MCU 2: (A1-2, V1,2): Data structure of numeral 421 of FIG. 15B

MCU 2→MCU 1: (A3-4-5, V3,4,5): Data structure of numeral 422 of FIG. 15B

In this way, in the data transmission system 40A as well, the amount of information of the signals flowing over the entire network can be reduced, and the traffic can be reduced.

Third Embodiment

Figure 16:
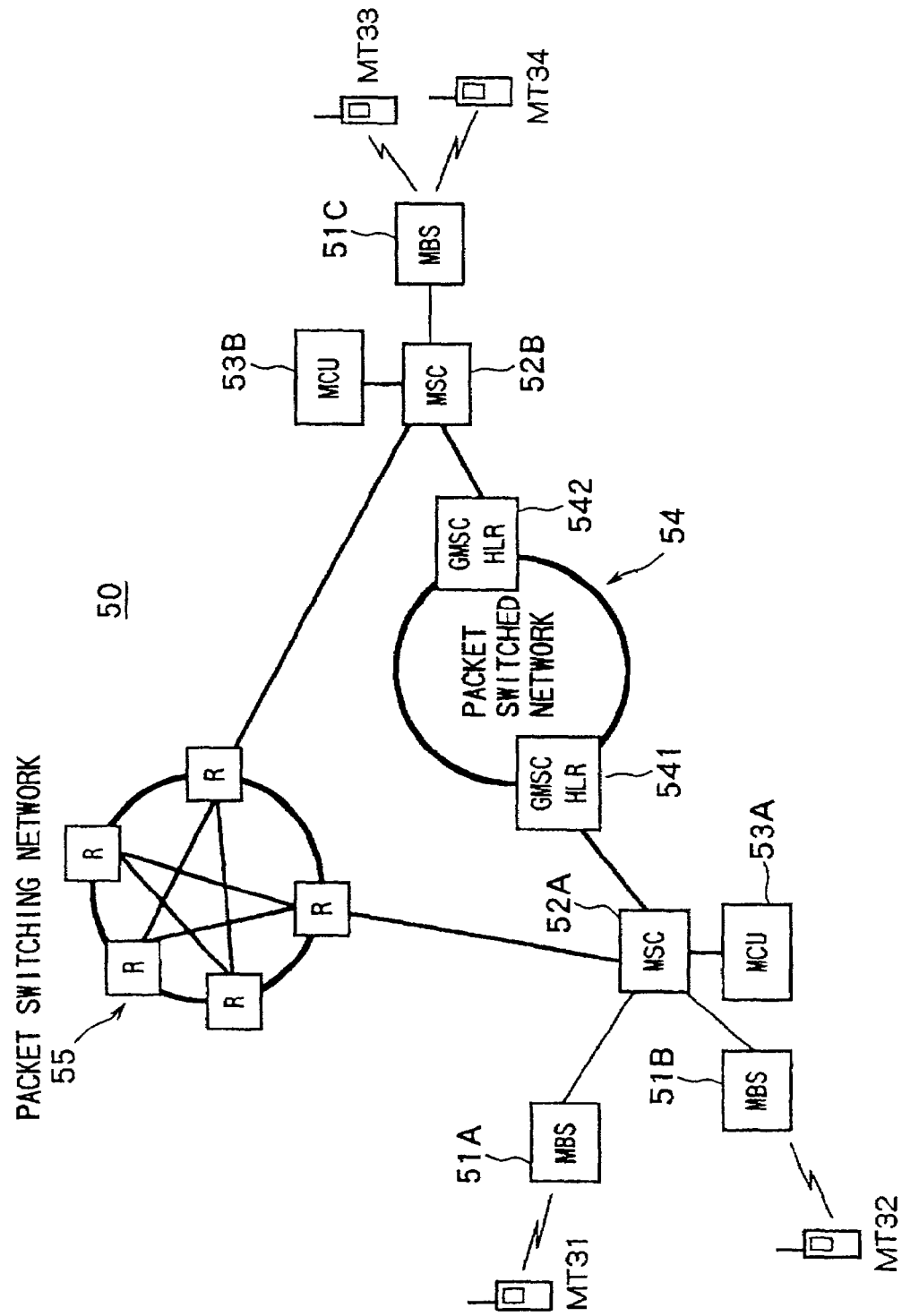
FIG. 16 is a view for explaining a third embodiment of the data transmission system employing the data transmission method according to the present invention and a view of a first example of the configuration thereof.
Figure 17:
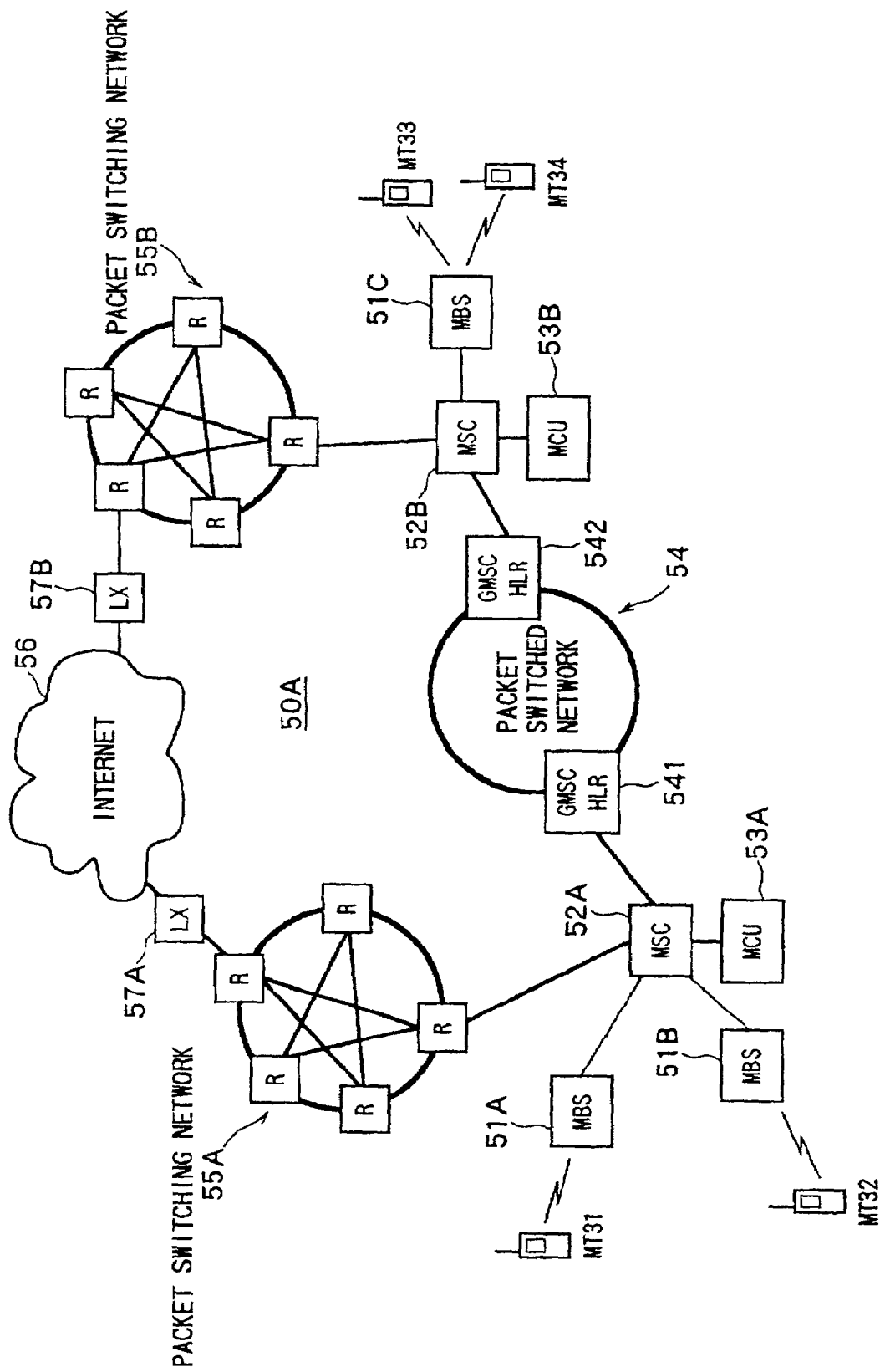
FIG. 17 is a view for explaining the third embodiment of the data transmission system employing the data transmission method according to the present invention and a view of a second example of the configuration thereof.
Figure 18:
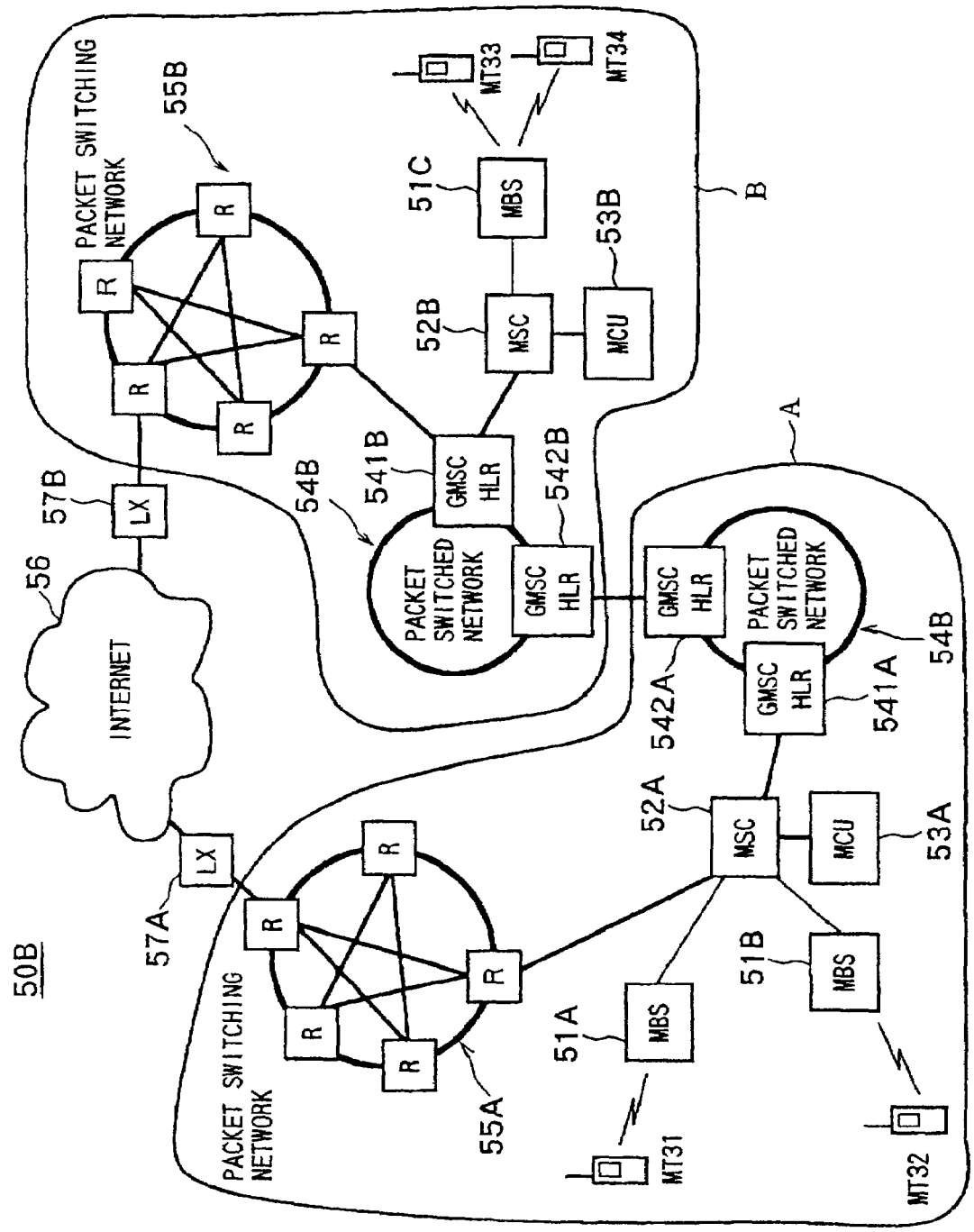
FIG. 18 is a view for explaining the third embodiment of the data transmission system employing the data transmission method according to the present invention and a view of a third example of the configuration thereof.

FIG. 16, FIG. 17, and FIG. 18 are views for explaining a third embodiment of a data transmission system employing a data transmission method according to the present invention.

The data transmission system according to the third embodiment is configured based on the following characteristics.

The signals where continuity is regarded as important (for example the information concerning the audio) are transmitted over a network having a higher QoS (quality of service), while the signals for which discontinuity can be permitted (for example the video) are transmitted over a network having a lower QoS.

A network having a high QoS includes a circuit switched network at present, while a network having a low QoS includes a packet switching network.

Therefore, in the third embodiment, the information concerning the audio is transmitted to the circuit switched network, and the information concerning the video is transmitted to the packet switching network.

The information concerning the audio has a smaller amount of information in comparison with the video, but the continuity is regarded as important. Conversely, in the video, the amount of information is large, but the continuity is not regarded as so important in comparison with the audio.

FIG. 16 is a view of a first example of the configuration of a data transmission system according to the third embodiment.

In this data transmission system 50 as well, the terminals are indicated by the symbols MT31 to MT34 in the same way as FIG. 11 and FIG. 12.

Further, in FIG. 16, 51A to 51C denote MBSs, 52A and 52B denote MSCs, 53A and 53B denote MCUs, 54 denotes a circuit switched network, and 55 denotes a packet switching network.

In the circuit switched network 54, GMSCs 541 and 542 having home location registers (HLR) are arranged.

The MBSs 51A and 51B, MCU 53A, GMSC 541 of the circuit switched network 54, and the packet switching network 55 are connected to the MSC 52A, while the MBS 51C, MCU 53B, GMSC 542 of the circuit switched network 54, and the packet switching network 55 are connected to the MSC 52B.

In this data transmission system 50, when transferring signals containing information concerning for example the video and the audio from the terminal MT31 and MT32 side to the terminal MT33 and MT34 side, under the control of the MCU 53A, the MSC 52A transmits the information concerning the audio where continuity is regarded as important to the circuit switched network 54 having a higher QoS (quality of service) and transmits the video signal for which discontinuity can be permitted to the packet switching network 55 having a low QoS.

Then, the information concerning the audio and the video signals transmitted through the circuit switched network 54 and the packet switching network 55 are combined to a single signal at the MSC 52B and transmitted via the MBS 51C to the terminals MT33 and MT34.

In this way, according to the data transmission system 50 according to the third embodiment, since information concerning the audio where continuity is regarded as important is allocated to a switching network having a high QoS and few bands, and information concerning the video for which the continuity is not regarded as so important is allocated to a switching network having a low QoS and many bands, there are the advantages such that the transmission cost can be greatly enhanced, and the effective utilization of the network becomes possible.

When comparing the amount of transmission, the packet switching network 55 is more expensive than the circuit switched network 54. However, if CoS (class of service) is introduced in the future, it is projected that the cost will be lowered all at once in the "best effort" region.

FIG. 17 is a view of a second example of the configuration of a data transmission system according to the third embodiment.

The difference of this data transmission system 50A according to the second example of the configuration from the first example of the configuration of FIG. 16 resides in that the Internet 56 is utilized for the network having a low QoS, and the Internet 56 is connected to the packet switching networks 55A and 55B via Internet exchanges (IX) 57A and 57B.

In this data transmission system 50A as well, the information where continuity is regarded as important is transmitted to the circuit switched network 54, while the information for which the continuity is not regarded as so important is transmitted through transmission lines formed by the packet switching networks 55A and 55B and the Internet 56.

In the second example of the configuration, similar effects to the effects of the first example of configuration can be obtained.

FIG. 18 is a view of a third example of the configuration of the data transmission system according to the third embodiment.

This third example of the configuration assumes the case of international roaming.

Specifically, systems A and B resembling FIG. 16 are present in for example two countries. The data transmission system 50B is configured by the packet switching networks 55A and 55B of the systems A and B connected by the Internet 56.

Note that, in this third example of the configuration, as a network having a low QoS and cheap cost, a path that passes through the packet switching network from the layer of GMSC, passes through the packet switching network of the other country via the Internet, and returns to the circuit switched network is formed.

In the third example of the configuration as well, similar effects to the effects of the first example of the configuration mentioned above can be obtained.

Fourth Embodiment

FIGS. 19A to 19C and FIG. 20 are views for explaining a fourth embodiment of the present invention.

In the fourth embodiment, as the data transmission system, use is made of one which allocates information concerning the audio where the continuity is regarded as important to a switching network having a high QoS and few bands and allocates information concerning the video for which the continuity is not regarded as so important to a switching network having a low QoS and many bands, shown in FIG. 16 to FIG. 18.

Further, in the fourth embodiment, the transmission delays are monitored and controlled as explained below.

1) Using the signals transmitted over the network having a high QoS (for example the audio) as a reference, the signals transmitted over the network having a low QoS (for example the video) are multiplexed and combined matching with the display time and transmitted to the intended terminals.

2) When the signals transmitted over the network having a low QoS (for example the video) are delayed more than a certain predetermined level in comparison with the signals transmitted over the network having a high QoS (for example, the audio), the timings of the display are shifted at the receiver side. For this purpose, the values of the time stamp (for example DTS) are delayed by that amount.

3) When the signals transmitted over the network having a low QoS (for example the video) are delayed more than a certain predetermined level in comparison with the signals transmitted over the network having a high QoS (for example the audio), the transmission to the network is controlled at the transmitter side.

As the method for control, there are the method of lowering the bit rate and the method of lowering the frame rate.

Where the congestion of the network having a low QoS is not eased, the end-to-end delay of the system is delayed.

FIGS. 19A to 19C are explanatory views of the monitoring and the control of the transmission delays according to the fourth embodiment, while FIG. 20 is a flowchart of the monitoring and the control of the transmission delays according to the fourth embodiment.

Figure 1:
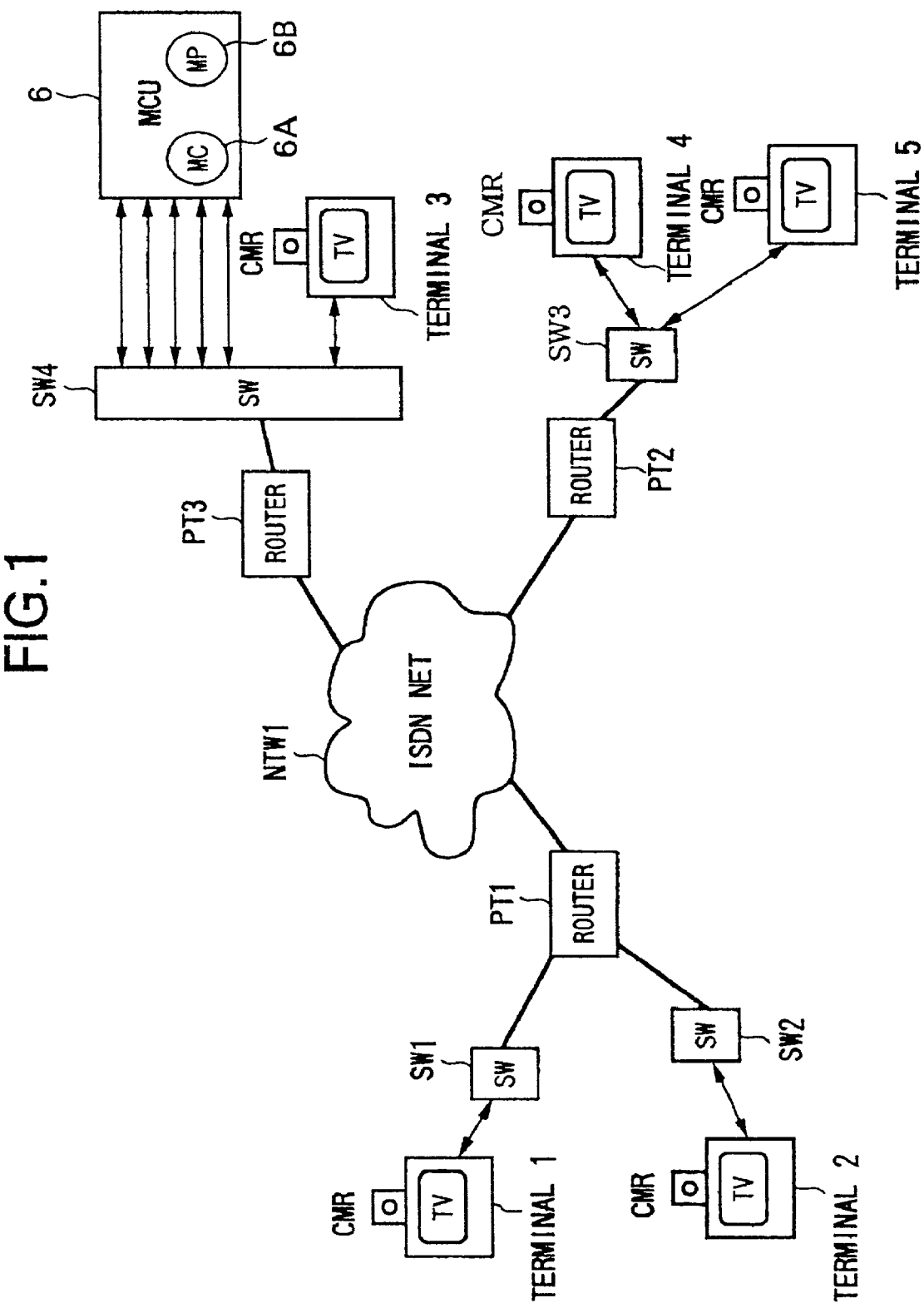
FIG. 1 is a view of an example of a television (TV) conference system.
Figure 2:
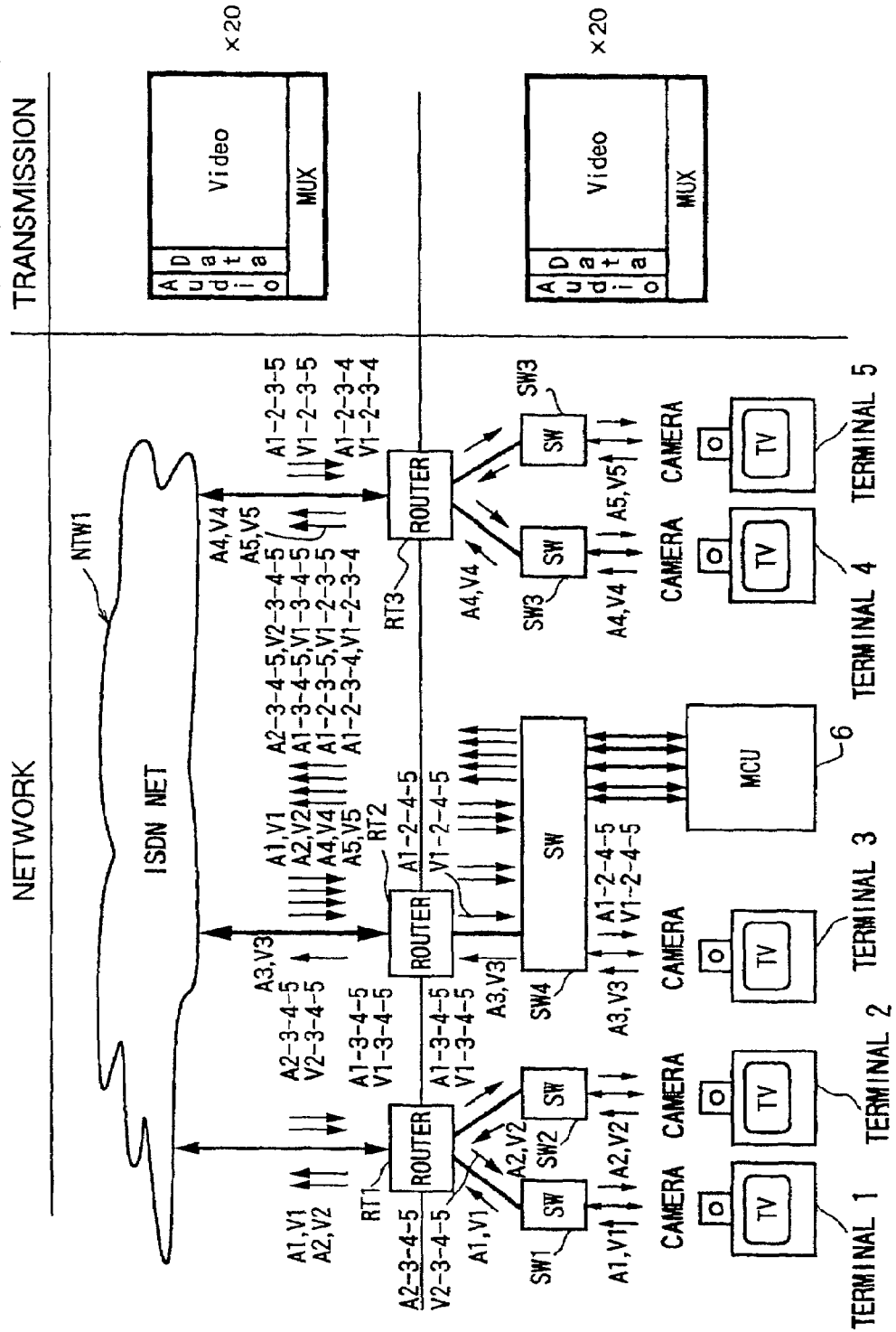
FIGS. 2A and 2B are views of the structure of the data flowing over a network in the TV conference system of FIG. 1 and the amount of transmission.
Figure 3:
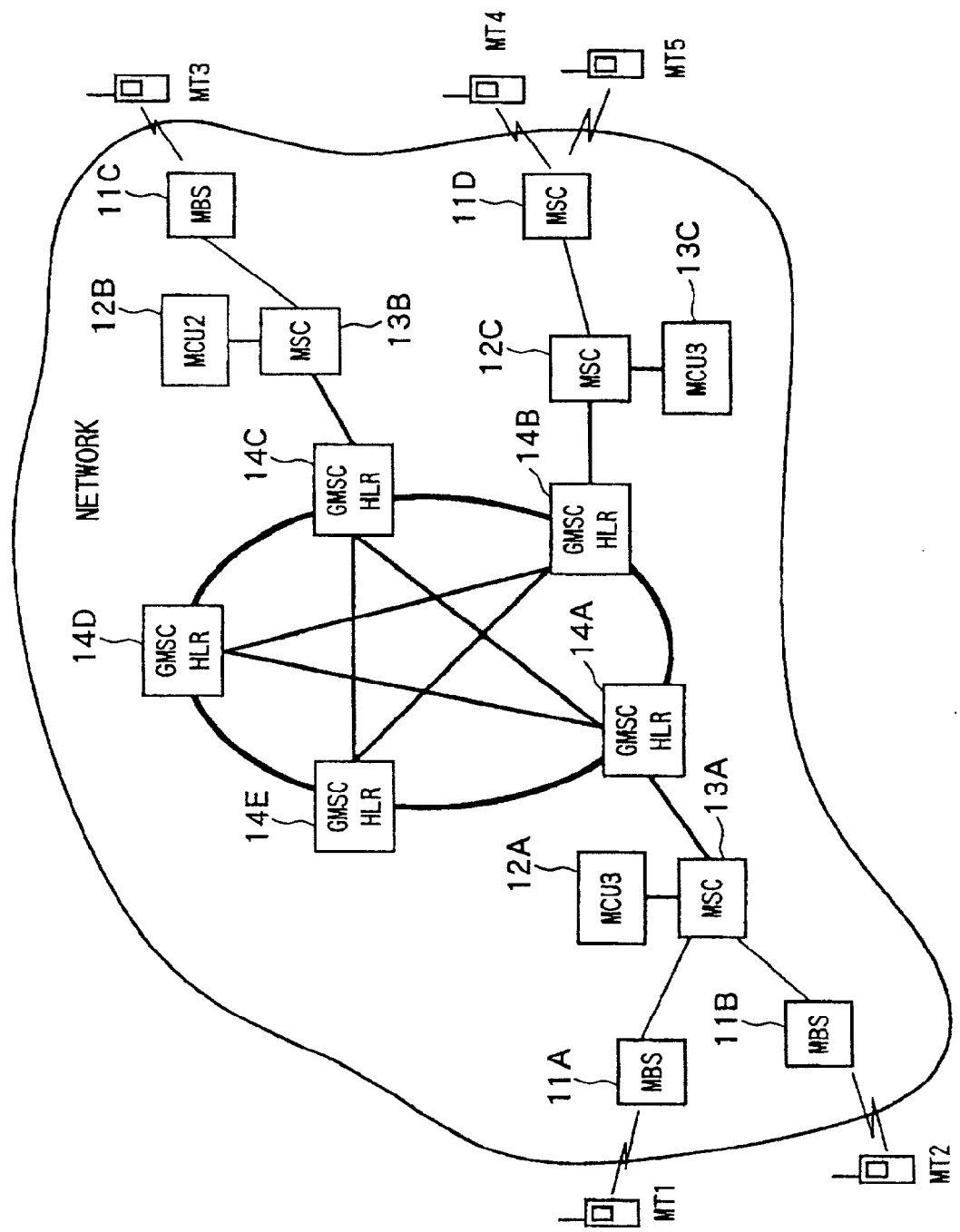
FIG. 3 is a view of a topology in a case where the TV conference system is applied to wireless telephones (example of the configuration of the multipoint communication)
Figure 9:
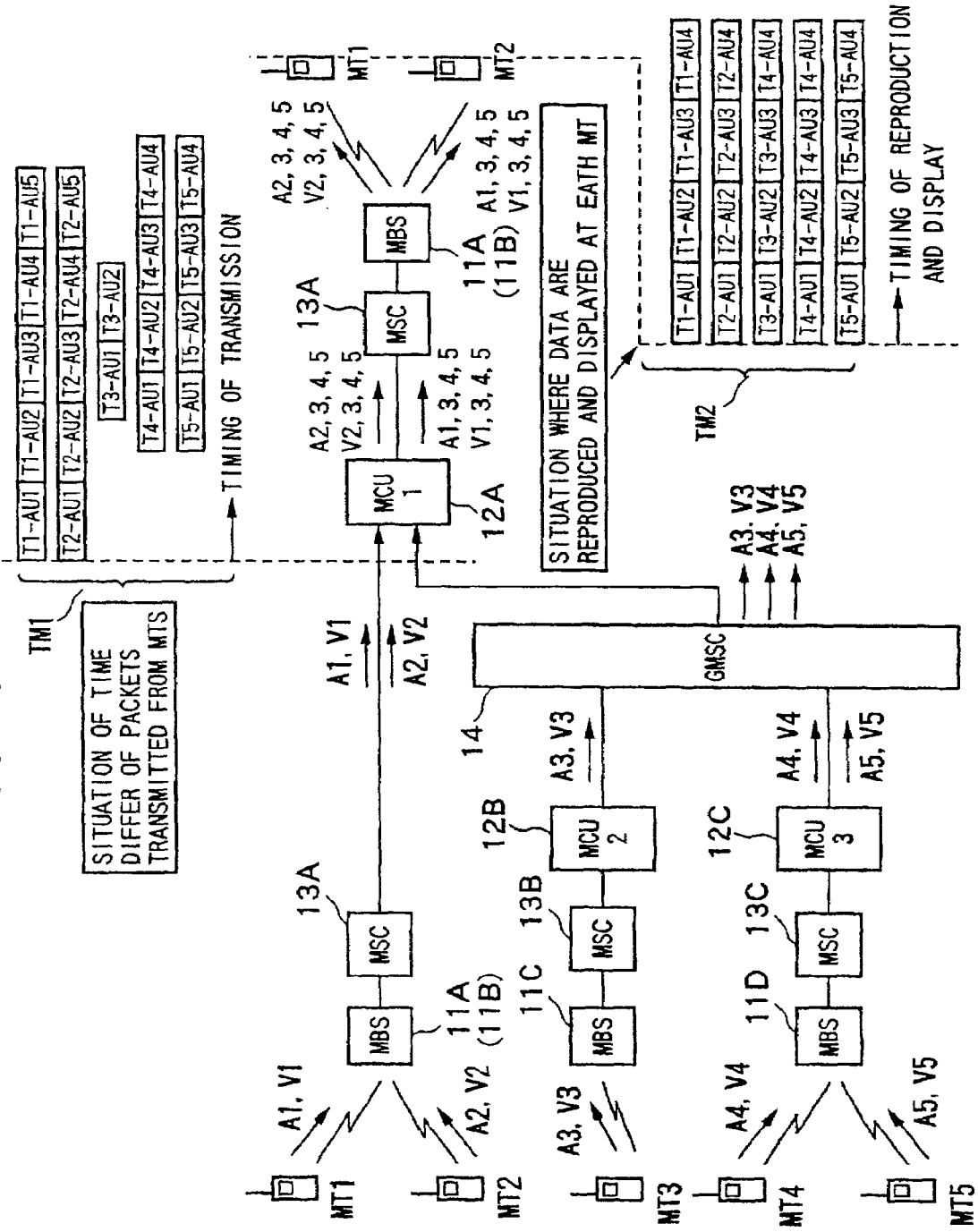
FIG. 9 is a view for explaining a flow and a timing of the signals in a case where a DTS shown in FIGS. 7A to 7C and FIGS. 8A to 8C are utilized for the multipoint communication.
Figure 10:
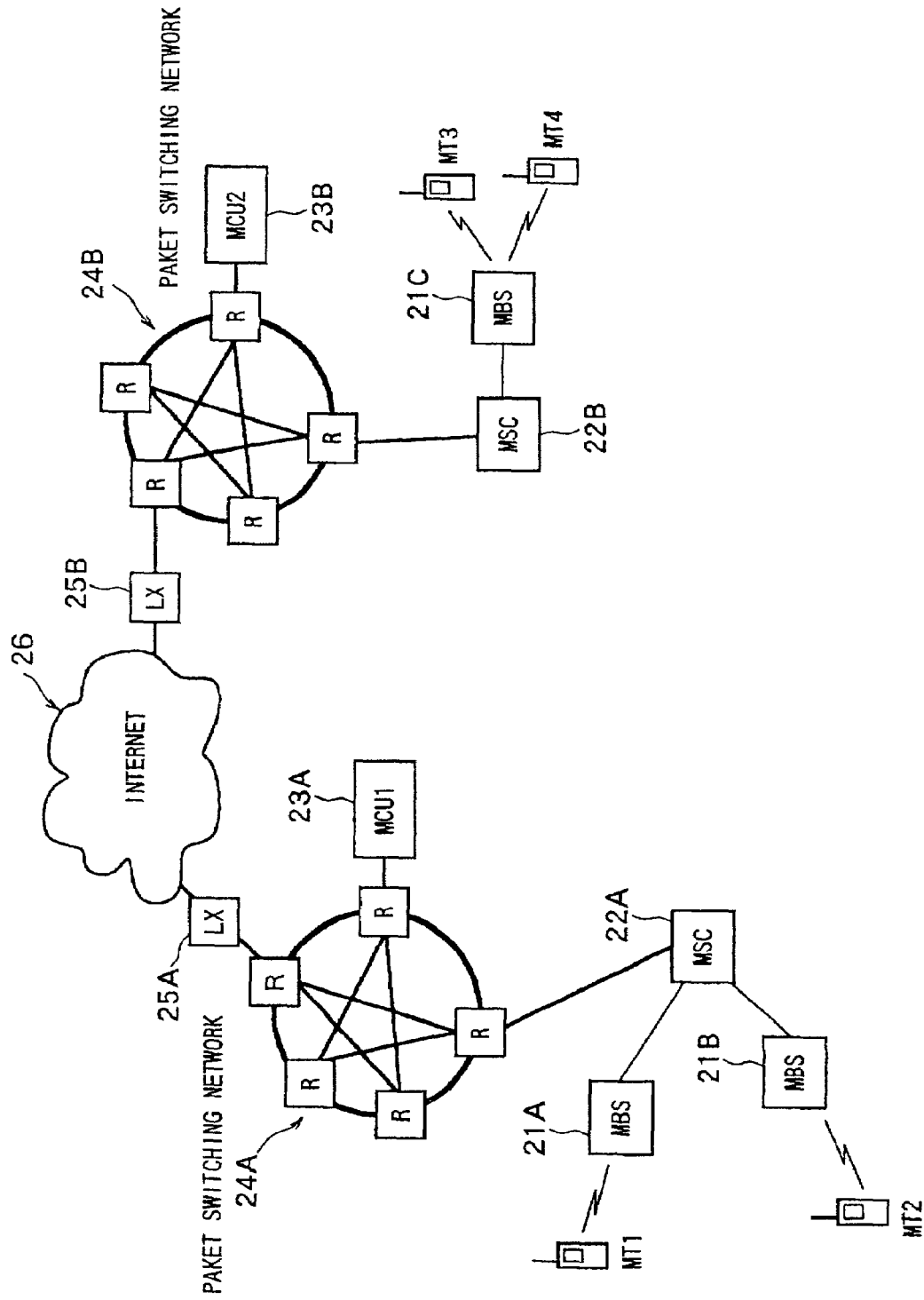
FIG. 10 is a view of an example of the configuration of multipoint communication utilizing only a network having a low QoS.

In FIG. 19A, 1) indicates a situation where the video is input to a terminal, 2) indicates a situation where the input signals are encoded in units of access units, 3) indicates a situation where the audio is input to a terminal, 4) indicates a situation where the input audio signals are encoded in units of access units, and 5) and 6) indicate situations where the video and audio are reproduced and displayed at the same timing according to the end-to-end delay.

In order to enable this, using the signals transmitted over the network having a high QoS (for example the audio) as the reference, the signals transmitted over the network having a low QoS (for example the video) are multiplexed and combined matching with the display time and transmitted to the intended terminals.

Further, as shown in FIGS. 19B and 19C, the delay value of the network having a low QoS is observed and monitored. When it becomes larger than the estimated end-to-end delay value, it is possible to add this delay value to the DTC of the video transmitted to the network having a low QoS on the receiver side so as to display the data with a delay by that amount at the terminal.

Further, where congestion occurs in the network having a low QoS, in order to quickly ease this, it is possible to decide if the delay value is increasing and is larger or smaller in comparison with the estimated end-to-end delay value and thereby have the receiver side, as previously mentioned, replace the value of the DTS and the transmission side control of the information to be transmitted to the network.

The flow of the above series of operations is shown in the flowchart of FIG. 20.

Namely, first, the delay values among the MCUs in the network having a low QoS are observed (ST1).

Next, it is decided whether or not a delay value is larger than that of the previous time (ST2).

When it is decided at step ST2 that a delay value is larger than that of the previous time, it is decided whether or not the delay value is larger in comparison with the estimated end-to-end delay (ST3).

When it is decided at step ST3 that the delay value is larger than the estimated end-to-end delay value, it is assumed that the delay value is increasing and is exceeding the permissible value, the DTSs of the signals flowing through the network having a low QoS are replaced, and the transmission of the signals to the network having a low QoS is controlled (ST4).

When it is decided at step ST3 that the delay value is smaller than the estimated end-to-end delay value, it is assumed that the delay value is increasing but not exceeding the permissible value and the transmission of the signals to the network having a low QoS is controlled (ST5).

Further, when it is decided at step ST2 that the delay value is smaller than that of the previous time, it is decided whether or not the delay value is larger than the estimated end-to-end delay value (ST6).

When it is decided at step ST6 that the delay value is larger than the estimated end-to-end delay value, it is assumed that the delay value is decreasing and exceeds the permissible value, the DTSs of the signals flowing through the network having a low QoS are replaced, and the control of the transmission of the signals to the network having a low QoS is eased (ST7).

When it is decided at step ST6 that the delay value is smaller than the estimated end-to-end delay value, it is assumed that the delay value is decreasing and does not exceed the permissible value, the DTSs of the signals flowing through the network having a low QoS are returned to the original values, and the transmission of the signals to the network having a low QoS are returned to the original level (ST8).

According to the fourth embodiment, it becomes possible to synchronize a plurality of signals (for example the audio and the video) transmitted over different bands.

Summarizing the effects of the invention, as explained above, according to the present invention, the traffic of the signals flowing over the entire network can be reduced.

Further, according to the present invention, a large delay unit becomes unnecessary in the MCU for performing the multiplexing and composition, so the size of the hardware can be reduced.

Further, the delay among multiple points at the time of multipoint communication can be made as short as possible.

Further, according to the present invention, all signals can be continuously transmitted without interpolation and thinning for more important signals and signals where continuity is regarded as important (for example the audio). Further, it becomes possible to set the total transmission cost cheap by utilizing bands having a low QoS for signals having a lower degree of importance and for which continuity is not regarded as important (for example the video).

Further, the utilization efficiency can be improved from the viewpoint of the effective utilization of the bands.

Further, according to the present invention, it becomes possible to synchronize a plurality of signals (for example the audio and the video) transmitted over different bands.

Further, according to the present invention, the trouble of an enormous amount of signals building up in the transmission lines and the data not being updated for a long time can be avoided.

While the invention has been described with reference to specific embodiment chosen for purpose of illustration, it should be apparent that numerous modifications could be made thereto by those skilled in the art without departing from the basic concept and scope of the invention.

What is claimed is:

1. A data transmission method for transmitting a plurality of data streams among multiple points from a plurality of terminals arranged in a network, comprising;
   transmitting each of said plurality of data streams through one of a plurality of networks having different properties;
   recombining them after transmission over the networks and transmitting them to the terminals; and
   when a network having a superior property is defined as a master network, and the others are defined as slave networks, monitoring the delay values of the slave networks based on the master network as the standard and restricting the transmission of data through a slave network when that slave network has more than a certain delay in comparison with the master network.

2. The data transmission method as set forth in claim 1 further comprising, when restricting the transmission of data to a slave network, if the data transmitted over the slave network employs a compression method utilizing correlation among access units, controlling the data transmitted to the network for every unit of interruption of the correlation.

3. The data transmission method as set forth in claim 1 further comprising, when restricting the transmission of data to a slave network, transmitting data for restricting a frame rate and a bit rate from the network to the terminals.

4. A data transmission system for transmitting a plurality of data streams among multiple points from a plurality of terminals arranged in a network, comprising:
   a plurality of networks having different properties;
   a first device for transmitting each of said plurality of data streams through a network having a different property;
   a second device for recombining the data streams after transmission over the networks and transmitting them to the terminals; wherein when a network having a superior property is defined as a master network, and the others are defined as slave networks, the first device monitors delay values of the slave networks based on the master network as the standard and restricts the transmission of data through a first slave network when the first slave network has more than a certain delay in comparison with the master network.

5. The data transmission system as set forth in claim 4 wherein, when restricting the transmission of data to a slave network, if the data transmitted over the slave network employs a compression method utilizing correlation among access units, the first device controls the data transmitted to the network for every unit of interruption of the correlation.

6. The data transmission system as set forth in claim 4 wherein, when restricting the transmission of data to a slave network, the first device transmits data for restricting a frame rate and a bit rate from the network to the terminals.

* * * * *